(12) United States Patent
Caggiano

(10) Patent No.: US 8,551,230 B2
(45) Date of Patent: *Oct. 8, 2013

(54) PH2OCP—PORTABLE WATER AND CLIMATIC PRODUCTION SYSTEM

(75) Inventor: Mario Caggiano, Montreal (CA)

(73) Assignee: 7142871 Canada Inc., Riviere-des-Prairies, Montreal, Quebec (CA)

( * ) Notice: Subject to any disclaimer, the term of this patent is extended or adjusted under 35 U.S.C. 154(b) by 303 days.

This patent is subject to a terminal disclaimer.

(21) Appl. No.: 12/923,154

(22) Filed: Sep. 7, 2010

(65) Prior Publication Data
US 2011/0056220 A1    Mar. 10, 2011

Related U.S. Application Data

(60) Provisional application No. 61/276,038, filed on Sep. 8, 2009, provisional application No. 61/268,004, filed on Jun. 8, 2009.

(51) Int. Cl.
*B01D 53/02* (2006.01)

(52) U.S. Cl.
USPC ................... 96/125; 95/113; 95/117

(58) Field of Classification Search
USPC ............ 95/113, 117, 123, 148; 96/125, 96/143, 144, 146, 150
See application file for complete search history.

(56) References Cited

U.S. PATENT DOCUMENTS

| | | | |
|---|---|---|---|
| 3,844,737 A * | 10/1974 | Macriss et al. | 95/93 |
| 4,134,743 A * | 1/1979 | Macriss et al. | 95/113 |
| 4,805,317 A | 2/1989 | Inglis | |
| 4,948,392 A * | 8/1990 | Rush | 95/113 |
| 5,659,974 A * | 8/1997 | Graeff | 34/378 |
| 5,667,560 A * | 9/1997 | Dunne | 95/113 |
| 6,029,462 A * | 2/2000 | Denniston | 62/94 |
| 6,029,467 A | 2/2000 | Moratalla | |
| 6,178,762 B1 * | 1/2001 | Flax | 62/271 |
| 6,767,391 B2 * | 7/2004 | Tanaka et al. | 96/115 |
| 6,918,263 B2 * | 7/2005 | Lee et al. | 62/271 |

(Continued)

FOREIGN PATENT DOCUMENTS

| | | |
|---|---|---|
| GB | 2357983 A | 7/2001 |
| JP | 2010-046636 | 3/2010 |

OTHER PUBLICATIONS

International Search Report and Written Opinion for PCT/IB2011/003334 dated Jun. 8, 2012.

*Primary Examiner* — Duane Smith
*Assistant Examiner* — Christopher P Jones
(74) *Attorney, Agent, or Firm* — Husch Blackwell LLP

(57) ABSTRACT

The present invention "PH2OCP" relates to a portable water and climatic production system. In the preferred embodiment, the system uses a combination of heating coils assemblies, cooling coils and more specifically the desiccant rotor technology for the extraction, collection of water vapor molecules from the air stream and transformation in to condensate for the production of clean filtered potable water. The portable water and climatic production system or "PH2OCP" is designed to operate and produce water in a wide range of global climatic conditions, including the most arid of environments. This is made possible due to the highly effective performance capabilities of the desiccant rotor technology in the extraction of water vapor molecules from any existing ambient air. The desiccant technology is designed in the "PH2OCP" to operate in combination with the microwave reactivation system in the regeneration or reactivation section and cooling coils assembly located in the condensation section.

8 Claims, 9 Drawing Sheets

(56) References Cited

U.S. PATENT DOCUMENTS

| | | | |
|---|---|---|---|
| 7,037,358 B2 * | 5/2006 | Babicki et al. | 95/96 |
| 7,097,925 B2 * | 8/2006 | Keefer | 429/9 |
| 7,166,149 B2 * | 1/2007 | Dunne et al. | 95/113 |
| 7,308,798 B2 * | 12/2007 | Caggiano | 62/63 |
| 2006/0144226 A1 * | 7/2006 | Damrath et al. | 95/90 |
| 2006/0272174 A1 * | 12/2006 | Hartig | 34/475 |
| 2007/0056307 A1 * | 3/2007 | Caggiano | 62/271 |
| 2009/0071110 A1 * | 3/2009 | Gonze et al. | 55/282.3 |
| 2009/0139254 A1 | 6/2009 | Landry | |
| 2011/0011260 A1 * | 1/2011 | Caggiano | 95/91 |
| 2011/0056220 A1 | 3/2011 | Caggiano | |
| 2011/0296858 A1 * | 12/2011 | Caggiano | 62/94 |

* cited by examiner

PH2OCP—PORTABLE WATER AND CLIMATIC PRODUCTION SYSTEM

CROSS-REFERENCE TO RELATED APPLICATION

This non-provisional utility application claims priority over the provisional patent application numbered: U.S. 61/276,038
Title: PH2OCP—Portable Water and Climatic Production System
Filing Date Sep. 8, 2009
Confirmation No.: 6682
This non-provisional utility application also makes reference in the SPECIFICATION to a previously submitted non-provisional utility application which claimed priority over the provisional patent application number: U.S. 61/268,004
Title: Microwave Reactivation System for Standard and Explosion-Proof
Dehumidification System
Filing Date: Jun. 8, 2009
Confirmation No.: 8793

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The existence of moisture and humidity in all matter that surrounds us, in the air we breathe and in our environment play an integral part in promoting the essence of life. These same elements stem from the very source of all life which is water and of which in recent years has become extremely important and critical to properly manage, maintain and protect. This vital resource is becoming a priceless commodity due to the ever increasing global demands and population requirements for reusable, clean and potable water.

In recent years, several water production technological processes and techniques have been designed and developed to address these ever increasing global requirements. Some of the water production conventional hybrid systems presently on the market operate primarily by using heating and expanding the air's capability to absorb and retain moisture and then subsequently by cooling the air temperature below its dew point which condenses the suspended moisture into water droplets. Alternately, technologies have emerged such as water desalination systems which have been developed to process ocean salt water into potable water. Though effective, this technological solution has also proven to be costly both on the transformation and production of potable water as well as the high cost of system purchase and maintenance.

In addition, technologies such as water decontamination and filtration systems have also been developed as potable water production systems by removing harmful particles and bacteria in various non potable water sources. Whether these type systems deliver sanitized water or are limited in their processing and production capabilities, nevertheless, they still require a water source which may not always be existent and or available for use, in order to deliver decontaminated filtered water.

The (PH2OCP) Portable Water and Climatic Production system is a new and innovative technology which operates on a completely different premise which is that of differential moisture vapor concentration, vapor pressures and water vapor extraction.

All matter, substances including the ambient air and the environment hold moisture and water vapors that can be extracted.

The greater the dampness and humidity in the air, the greater the water vapor concentration. The PH2OCP system is designed and incorporates a desiccant rotor/wheel with three simultaneously operational yet segregated processes; an extraction process, a reactivation process and a condensation process.

The (PH2OCP) Portable Water and Climatic Production system combines high static and air velocity, a desiccant material for aggressive extraction of water vapors within the airstream, heat for air expansion and reactivation of the desiccant material and finally cooling for moisture vapor condensation and water production. In the preferred embodiment, the system is designed and can also be fitted and operated with a filtration and ultraviolet decontamination package to ensure that the resultant is free from particles and sanitized which then can be used as potable water. The operating principle of this system is that it incorporates a dry desiccant rotor/wheel constructed of a desiccant core material part of the extraction process. In the preferred embodiment, the core of the desiccant rotor/wheel is impregnated with silica gel which has a very low water vapor pressure. When damp humid high vapor pressure air molecules come in contact with the desiccant rotor/wheel surface low vapor pressure, the molecules move from high to low in an attempt to achieve equilibrium. As the wet damp airflow passes through the perforated desiccant material core in the desiccant rotor/wheel, the water vapor molecules are retained by the desiccant material part of the extraction process and the resulting discharge airflow is expelled extremely dry.

The dry airflow temperature is then raised substantially approximately 200 to 250 degrees F. as it is pulled through the superheated microwave reactivation system coils assembly part of the reactivation process. The dry airflow is drawn coming in contact again with the moisture laden desiccant core material within the desiccant rotor/wheel. This desiccant rotor/wheel rotates slowly about its longitudinal axis completing a full rotation approximately every 8-10 minutes. The heated airflow continues its path as it is pulled again through the segregated section of the perforated desiccant core material within the desiccant rotor/wheel. Heat as the effect of demagnetizing and deactivating the desiccant core material, enabling the desiccant material to release the accumulated water vapors into the heated dry airflow as it passes through.

The airflow continues to be drawn through the final section passing through the evaporator cooling coils in the condensation process where the water vapors are immediately cooled down to liquefy the vapors which condense into water. This water drips into a base receptacle located directly below the evaporator cooling coils and flowing through the filtration and decontamination section settling by gravity into the sealed water reservoir at the base of the unit. Though various filtration, purification and decontamination systems can be adapted and installed, in the preferred embodiment, the filtration is accomplished by an activated carbon filter and the decontamination and purification of the water by using an ultraviolet light UV lamp assembly which is enclosed in a transparent protective sleeve The airflow which is now cooled and dry is expelled through the process outlet by means of a high static pressure blower which maintains and ensures the constant airflow through the various sections and processes. The exhausted air can then be used as a byproduct to provide supplemental climatic conditioning and environmental temperature control within an enclosed space or area.

Depending on the ambient temperature and operational conditions, the PH2OCP system control panel assisted by signals transmitted from the onboard sensors including temperature, humidity and airflow, which are located in the unit's process inlet and outlet. These sensors provide data to the (PLC) programmable logic controller panel which monitors and controls the proper operation and modulation of the components and processes in order to provide the maximum extraction and production of water within the specific climatic environment. These operational settings are activated automatically or manually programmed into the (PLC) programmable logic controller panel according to the onsite climatic conditions in order for the PH2OCP system to attract and extract the maximum air moisture vapors and optimize on water production. Given that the PH2OCP system employs various combinations of processes operating alternately or simultaneously through the input of the (PLC) controller panel and sensors, this allows the system the capability to effectively continue extracting and condensing vapors into water even when the dew point air temperature drops below freezing.

Therefore, the (PH2OCP) Portable Water and Climatic Production system performance capabilities is maintained whether it operates in damp or dry environments within colder or warmer temperatures. The PH2OCP performance capabilities are not hampered or even affected by temperature conditions and variations like other conventional systems. These operational limitations and drawbacks are usually associated with conventional cooling-based and or hybrid heating/cooling systems where the water production output is directly affected and limited by existing climatic conditions and variations. The PH2OCP system new design uses alternately or simultaneously its various components to effectively operate and produce water in all climatic and environmental conditions. Its wide range operational capabilities extract moisture vapors from the ambient air within the surrounding environment including hot arid or extremely cold climatic conditions. Therefore, the PH2OCP system is capable of maximizing extraction and transformation of airborne moisture vapors found in the atmosphere into usable and or drinkable water in all climatic environments, anywhere in the world. The high efficiency and water extraction and production capabilities of the PH2OCP system are rendered possible due to the fact that it incorporates in its process a desiccant rotor/wheel assembly. The desiccant material impregnated within the core of the desiccant rotor/wheel is designed for extremely high water vapor collection, attracting and retaining up to 10,000 percent its dry weight in water vapors. As previously explained, in order to demagnetize and deactivate the rotor desiccant material to enable it to release the stored water vapors, a high (heat) temperature rise in the airflow is absolutely required in the reactivation process in order to dry out the rotor desiccant material and extract the moisture vapors, which usually translates into high energy requirements.

The generating of heat can be accomplished with the use of but not limited to the following systems; electric heating banks or elements, flame gas burners or submersible heater immersed in a fluid running through coils located in the airflow pathway that act in a way to radiate and transfer heat onto the reactivation process airflow. These methods are generally the most commonly used means to heat the desiccant material, so that the airflow temperature rises to a degree set point before coming in contact with the surface of the desiccant material. In the case of a conventional water production system where heating and or cooling processes are utilized separately or in combination such as a hybrid system. The role of the heating section is to raise the temperature and expand the air volume allowing it to hold more moisture. This airflow then goes through the refrigerant coils which rapidly cool down the airflow temperature enabling the extraction by condensation suspended moisture vapors.

The PH2OCP system design addresses this heat production issue by incorporating a new and highly energy efficient microwave reactivation system which is installed in the reactivation process. In the preferred embodiment, the microwave reactivation system is designed and intended to be a high heat generating source. This high heat source is crucial and required in order to substantially raise the temperature of the reactivation process airflow to the desired setting prior to coming in contact with the moisture laden desiccant core material. This microwave reactivation system incorporated within the PH2OCP system produces heat by generating electromagnetic waves which pass through materials and fluids, causing the molecules within to rapidly oscillate in excitation and in turn generating heat.

In the preferred embodiment, the medium used in the microwave reactivation system to store and transmit this heat is a thermal fluid. This fluid is moved by means of supply and return pumps, flowing through a first parallel series of glass ceramic coils which is part of a closed-loop circuit, passing through the microwave heating chamber where the fluid molecules are treated and exposed to electromagnetic waves causing excitation and generating high heat. This super heated thermal fluid then flows through a second parallel series of metallic coils located in the reactivation process, in the direct path of the airflow. This heat transfer from the thermal fluid to the heat conductive metallic coils substantially raises the temperature of the airflow as it comes in contact and passes across the surface of the coils. This heated airflow is then used to deactivate the perforated desiccant material which is impregnated within the desiccant rotor/wheel as it passes through it. This heat laden airflow has a demagnetizing effect on the desiccant material enabling it to release the retained accumulated moisture vapors and thus greatly lowering the vapor pressure in the desiccant material within the desiccant rotor/wheel as it rotates back for reuse in the moisture vapor extraction process. It will be appreciated that while the microwave reaction system would be part of the preferred embodiment, nevertheless, other means of conventional heating outlined but not limited to, such as; electrical heating elements, submersible heating element immersed in a thermal fluid, gas fired or others can be utilized and incorporated in the reaction process section. Therefore, the (PH2OCP) Portable Water and Climatic Production system can extract transform and produce usable and or potable water in all climatic conditions whatever the operational environment.

In addition, its new highly efficient systems and processes substantially diminish the electrical power demand and energy consumption without compromising on system capability and performance, surpassing all technologies presently used on the market.

BRIEF SUMMARY OF THE INVENTION

According to the broad aspect of an embodiment of the present invention, there is provided a (PH2OCP) Portable Water and Climatic Production system which is designed to extract water vapors from the ambient environment and transformation of these water vapors into usable water. The (PH2OCP) Portable Water and Climatic Production system accomplishes this task by incorporating in its design a desiccant rotor/wheel with three segregated processes; an extraction process, a reactivation process and a condensation process. The PH2OCP also provides as a byproduct air conditioning and dehumidifying capabilities of its airflow discharge from the process outlet, for conditioning of an enclosed area or space. The (PH2OCP) Portable Water and Climatic Production system has a desiccant rotor/wheel assembly which is mounted and rotates within a cabinet made up of three separate isolated sections called processes; extraction process, reactivation process and condensation process. The desiccant rotor/wheels' perforated core is impregnated with a desiccant type material which has the capability of capturing and retaining water vapors found in the ambient air and environment. The first section called the extraction process is intended as the collection and retention of the moisture/water vapors found in the ambient airflow.

A high static blower located in the process outlet is provided to draw the airflow at high velocity into the process inlet and through the desiccant rotor/wheel, where the desiccant material collects and retains the moisture vapors. The resultant dry airflow is drawn into the second section called the reactivation process. In the reactivation process, this airflow comes in contact and is heated by a microwave reactivation system which is comprised of a microwave heating chamber and two segregated series of hollow serpentine coils which have an internal heated thermal fluid which flows through them. These coil assemblies though segregated are interconnected by means of two circulation pumps as part of a closed-loop circuit. One glass-ceramic coil assembly is constructed within the microwave heating chamber separately located above the reactivation process section and the other metallic coil assembly is constructed in the reactivation process directly in the pathway of the dry airflow.

The thermal fluid is super heated as it is pumped through the glass-ceramic coil assembly in the microwave reactivation chamber and into the metallic coil assembly in the reactivation process section. The high heat radiated from the thermal fluid pumped in the reactivation process metallic coil assembly is transferred onto the dry airflow, substantially raising the dry airflow temperature before coming in contact with the desiccant rotor/wheel core surface. As the super heated dry airflow is drawn through the system passing through the desiccant rotor/wheel and perforated core material, this heated dry airflow effectively deactivates the moisture laden desiccant core material, enabling it to release the moisture vapors into the airflow.

This moisture saturated airflow is then drawn, leaving the desiccant rotor/wheel core material and transporting the water vapors through the third section which is called the condensation process. In the condensation process section, the high temperature wet airflow transporting the water vapors passes through an evaporator cooling coil assembly part of the unit's air-conditioning components. The wet airflow temperature is rapidly cooled and as a resultant producing condensate or water. This water is gravity fed to a receptacle which directs it to a unit reservoir located at the base of the system. In the preferred embodiment, the water is directed through an active carbon filter and ultraviolet UV decontamination package which is located right below the evaporator cooling coils in the condensation process section. This would ensure that any existing contaminants, particles and bacteria have been removed and destroyed in order to provide the resultant which is sanitized, clean and potable water. The treated and conditioned dry airflow which is void of water vapors is then drawn through the high static blower located in the process outlet, discharging it to the ambient atmosphere. This treated airflow is a byproduct which can be then used for conditioning of an enclosure or space. Therefore, the (PH2OCP) Portable Water and Climatic Production system perpetual process allows for continuous water production in all temperatures whatever the climatic conditions in which the system operates. The following is a brief description of the two distinct sub-systems operating in conjunction with the desiccant rotor/wheel assembly and incorporated within the PH2OCP system. The first is the microwave reactivation system part of the reactivation process and the second is the air treatment and conditioning system part of the condensation process.

These systems are both constructed and incorporated as part of the (PH2OCP) Portable Water and Climatic Production system design. The first sub-system is the microwave reactivation system part of the reactivation process. The microwave heating chamber is made up of an explosion-proof outer cabinet with an inner casing which includes a cavity with inner surfaces thereof forming a microwave heating chamber. A shielding plate forming a compartment located above the microwave heating chamber is to provide housing for the microwave power transformation components therein, such as; magnetron, high voltage transformer, diode, capacitor and other operational components.

In the preferred embodiment, the microwave reactivation system is comprised of two separate coil assemblies combined as part of a single closed-loop circuit. They are mounted and firmly secured in place by using a series of shock resistant mounting brackets. There is a glass-ceramic coil assembly which is mounted in the microwave heating chamber and a metallic coil assembly which is mounted in the reactivation process section. These coil assemblies are firmly linked at two opposite points by means of fittings and seals which are securely connected to separate pumps, one for supply and the other for return. The pumps ensure a steady and continuous heated thermal fluid flow from the microwave section to the reactivation section and back again. These pumps are oppositely located in a shielding plate forming a compartment in between the microwave heating chamber and the reactivation process section. This closed-loop circuit passes through both the microwave heating chamber and the reactivation process section of the PH2OCP system.

The hollow coil is constructed of one length and designed as a closed loop line, in which flows a thermal fluid, such as a; thermal oil or heater liquid, used to carry thermal energy. The thermal fluid is continuously heated within the microwave heating chamber as it is pumped and circulating through transferring the accumulated thermal energy/heat to the coils which radiate onto the airflow as it passes through the reactivation process section. The uninterrupted flow of the thermal fluid is ensured by the installation and operation of two pumps within the microwave reactivation system assembly. This ensures the circulation of the heated thermal fluid from the microwave heating chamber located in onto the reactivation process section and back again in a continuous perpetual process. This microwave reactivation system therefore generates the heat source and enables the proper airflow temperature rise which is required to successfully deactivate the desiccant core material found in the desiccant rotor/wheel assembly. This enables the release of the accumulated moisture/water vapors into the airflow being discharged to the ambient atmosphere. The enormous benefits of the microwave reactivation system is that it performs its primary function of providing a reactivation process heat source, while greatly reducing the energy requirement for heat generation and overall power consumption of the (PH2OCP) Portable Water and Climatic Production system. This important energy savings allow for the PH2OCP system to be more operationally viable specifically in areas which would have been previously unserviceable due to power supply limitations. The high energy requirements usually associated with the use of desiccant technology like the one incorporated in the PH2OCP system design is eliminated with the adaption of this microwave reactivation system.

Present sources of heat generation usually installed and utilized in desiccant reactivation systems such as; electric elements and electric heating banks, account for the major share of operating energy of a desiccant or conventional HVAC heating/cooling system. Because of the greatly reduced electrical power requirements needed to operate the microwave reactivation system, it therefore allows the PH2OCP system to be operated at optimum performance in environments and applications even found onshore, offshore, marine and military, where power availability may be limited and or utilized for other critical operational requirements. In the preferred embodiment, the cabinet of the microwave heating chamber part of the microwave reactivation system is of explosion-proof construction.

The second sub-system in the PH2OCP system is the air treatment and conditioning system part of the condensation process. In the preferred embodiment, the air treatment and conditioning system is constructed with the same components and configuration as a split air-conditioning unit. The system design includes a compressor, condenser coil assembly and fan, an expansion valve or refrigerant flow metering device, an evaporator cooling coil assembly and blower, a chemical refrigerant and an automatic temperature sensors which are installed in the condenser unit, the condensation process outlet and linked to the (PLC) programmable logic controller panel. The compressor acts as the pump, circulating the refrigerant through the system. Its job is to draw in a low-pressure, low-temperature, refrigerant in a gaseous state and by compressing this gas, raise the pressure and temperature of the refrigerant. This high-pressure, high-temperature gas then flows to the condenser coil assembly.

The condenser coil assembly is a series of finned coils/piping with a fan that draws outside air across the coil assembly. As the refrigerant passes through the condenser coil assembly and the outside air passes across the coil fins, the heat from the refrigerant is rejected to the outside air which causes the refrigerant to condense from a gas to a liquid state. The high-pressure, high-temperature liquid then reaches the refrigerant flow metering device. The refrigerant flow metering device is the manager of the system and directed by input from the PLC controller panel. By sensing the temperature &/or pressure of the evaporator cooling coils located in the condensation process section, it allows liquid refrigerant to pass through a very small orifice, which causes the refrigerant to expand to a low-pressure, low-temperature gas. This cold refrigerant flows to the evaporator. The evaporator cooling coils is a series of finned coils/tubes aided by a high static blower that draws the condensation process airflow across it, causing the evaporator cooling coils to absorb heat from the air. This heat transfer allows for rapid temperature drop, cooling the wet hot airflow which induces condensation of the moisture vapors into water. The byproduct is cooled and conditioned dry air which is siphoned into the high static blower and discharged to the enclosures and or areas to be air-conditioned. The refrigerant then flows back to the compressor where the cycle resumes once again.

These new and advanced sub-systems in conjunction with the desiccant technology provide the (PH2OCP) Portable Water and Climatic Production system design with enormous operational versatility, increased efficiency, drastically reduced energy consumption and unmatched performance capabilities in water production.

BRIEF DESCRIPTION OF THE SEVERAL VIEWS OF THE DRAWING

The embodiments of the present invention shall be more clearly understood by making reference to the following detailed description of the embodiments of the invention taken in conjunction with the following accompanying drawings which are described as follows.

DETAILED DESCRIPTION OF THE INVENTION

Figure 1:
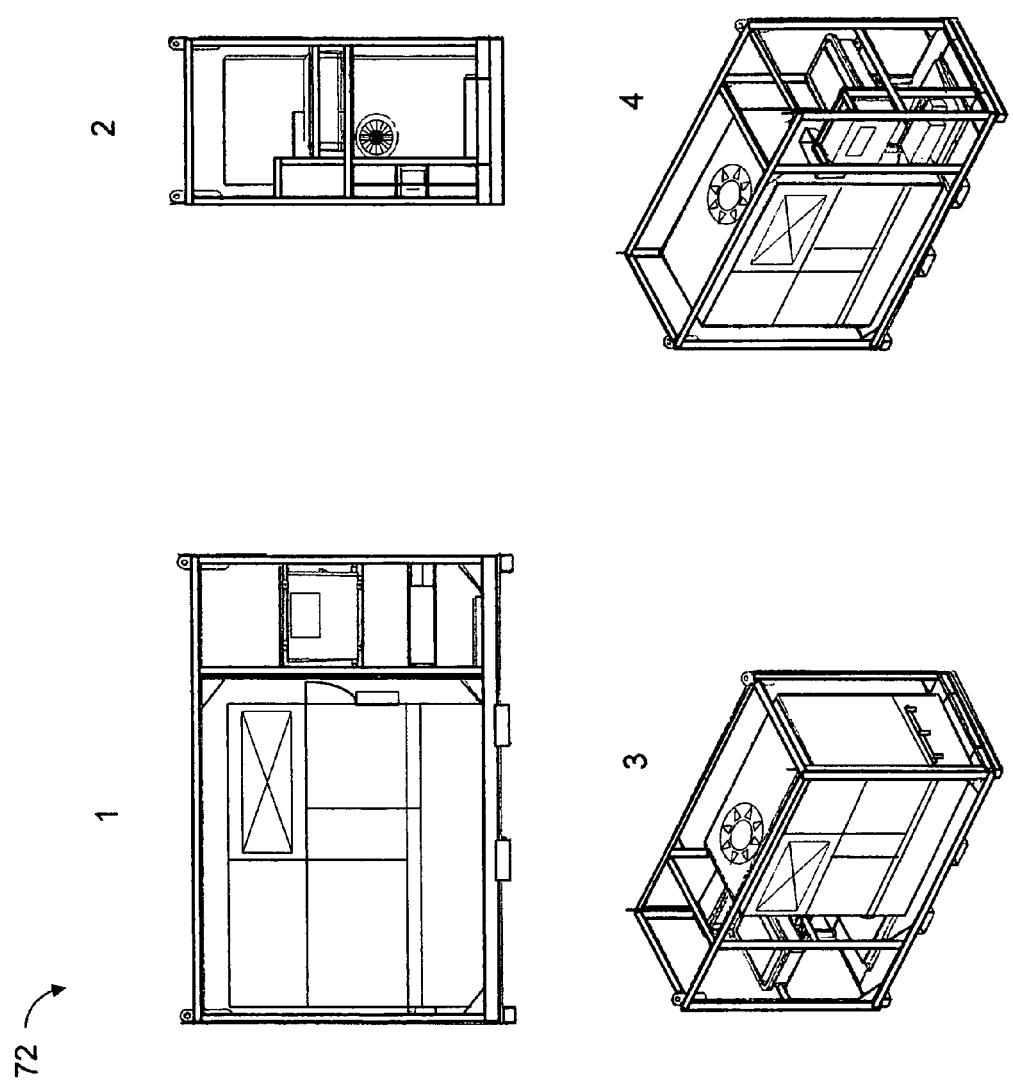
FIG. 1 is the schematic diagrams' elevation and prospective views of the (PH2OCP) Portable Water and Climatic Production system according to the preferred embodiment of the invention. These corresponding views are enlarged and shown on the FIGS. 3-7-8 and 9.

The description which follows and the embodiments described therein are provided by way if illustration of an example, or examples of particular embodiments of principles and aspects of the present invention. These examples are provided for the purpose of explanation and not of limitation, of those principles of the invention.

In the description that follows, like parts are marked throughout the specification and the drawings with the same respective reference numerals.

With regards to the nomenclature, the term "PH2OCP" as it is used throughout the specification identifies the Portable Water and Climatic Production system FIGS. 3, 4, 7, 8, 9, which will be designated generally with reference numeral 72 FIG. 1. The PH2OCP system herein includes various components and main sub-systems such as; desiccant rotor or wheel technology, microwave reactivation system, the air treatment and conditioning system as well as all parts, modules and electrical components. Referring to FIGS. 3, 4, 7, 8, 9, there are shown the PH2OCP system views illustrated on unit views 1, 2, 3 and 4 FIG. 1 as; elevation, sectional and perspective or isometric.

As will be explained in greater detail below, that the PH2OCP system through its processes such as; extraction, reactivation and condensation is operable and capable to extract moisture vapors from the ambient air and transform these same vapors into a usable water source.

The PH2OCP system as illustrated on FIG. 1 unit views 1, 2, 3 and 4, due to its new and advanced engineering design, this system can be installed and operated in any and all climatic environments to successfully produce usable water. In the preferred embodiment, the PH2OCP operational design incorporates the desiccant rotor technology coupled with two distinct subsystems; microwave reactivation system part of the reactivation process and air treatment and conditioning system part of the condensation process. In the preferred embodiment, the PH2OCP system 72 can also be fitted with components which enable water sanitization, ensuring that the resultant is clean decontaminated potable water. This water sanitization process is accomplished by incorporating the following components; an active carbon filter or layered filters and an ultraviolet (UV) lamps assembly which are both installed and located right below the evaporator cooling coils in the condensation process section. This water sanitization process enables water purification and decontamination which ensures that any existing particles, contaminants and bacteria have been removed and or destroyed in order to provide the resultant which is filtered, sanitized and drinkable potable water. The (PH2OCP) Potable Water and Climatic Production system operational design delivers enormous versatility and adaptability enabling the system to function efficiently at peak performance for continuous water production capability within all climatic conditions and environments.

As it will be explained below in greater detail, the PH2OCP system FIG. 1 unit views 1, 2, 3, and 4, is supported and mounted inside a rectangular box-like, rigid steel frame 18 FIGS. 3, 4, 7, 8, 9.

Figure 3:
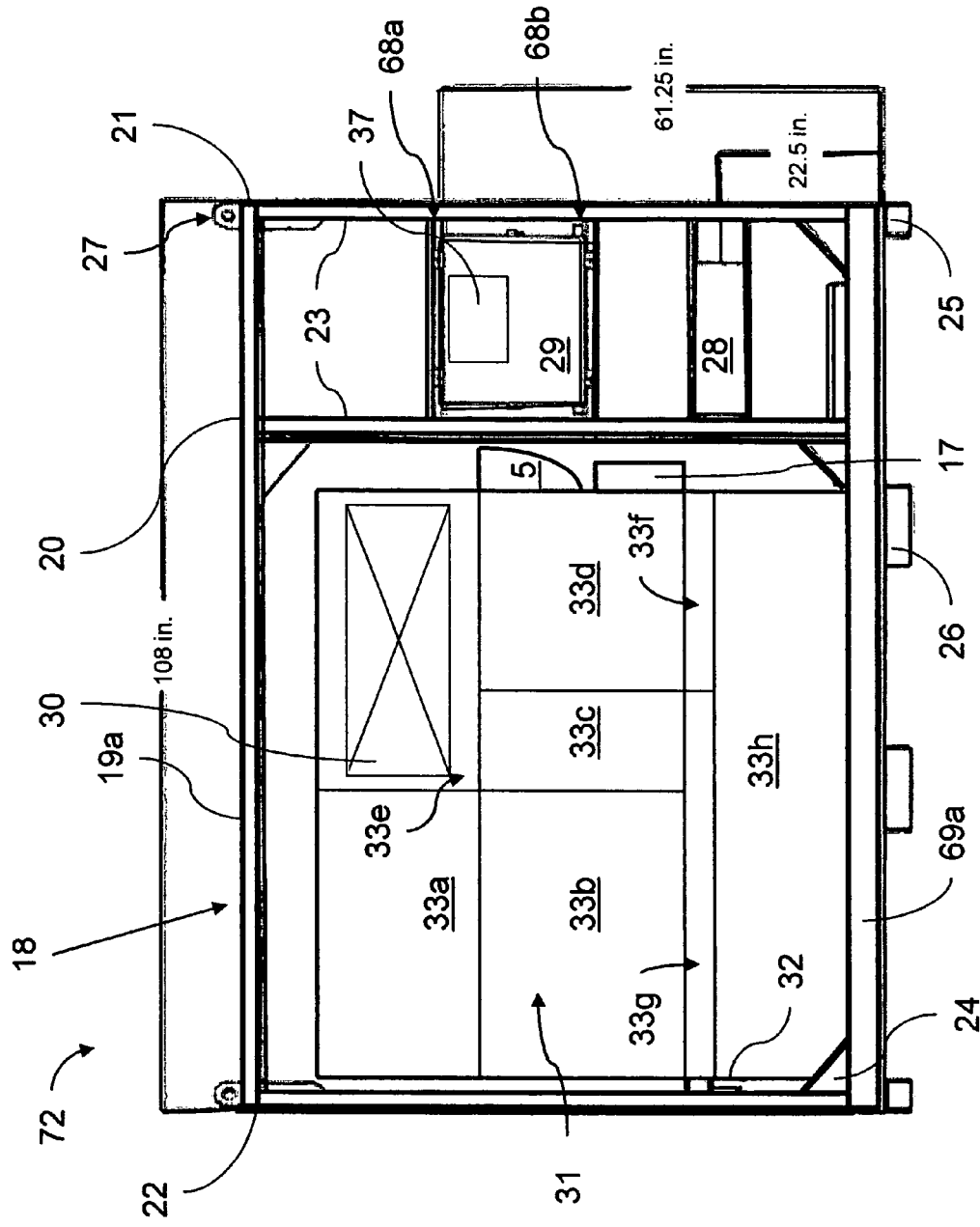
FIG. 3 is a schematic diagram elevation view of the (PH2OCP) Portable Water and Climatic Production system shown in FIG. 1.
Figure 7:
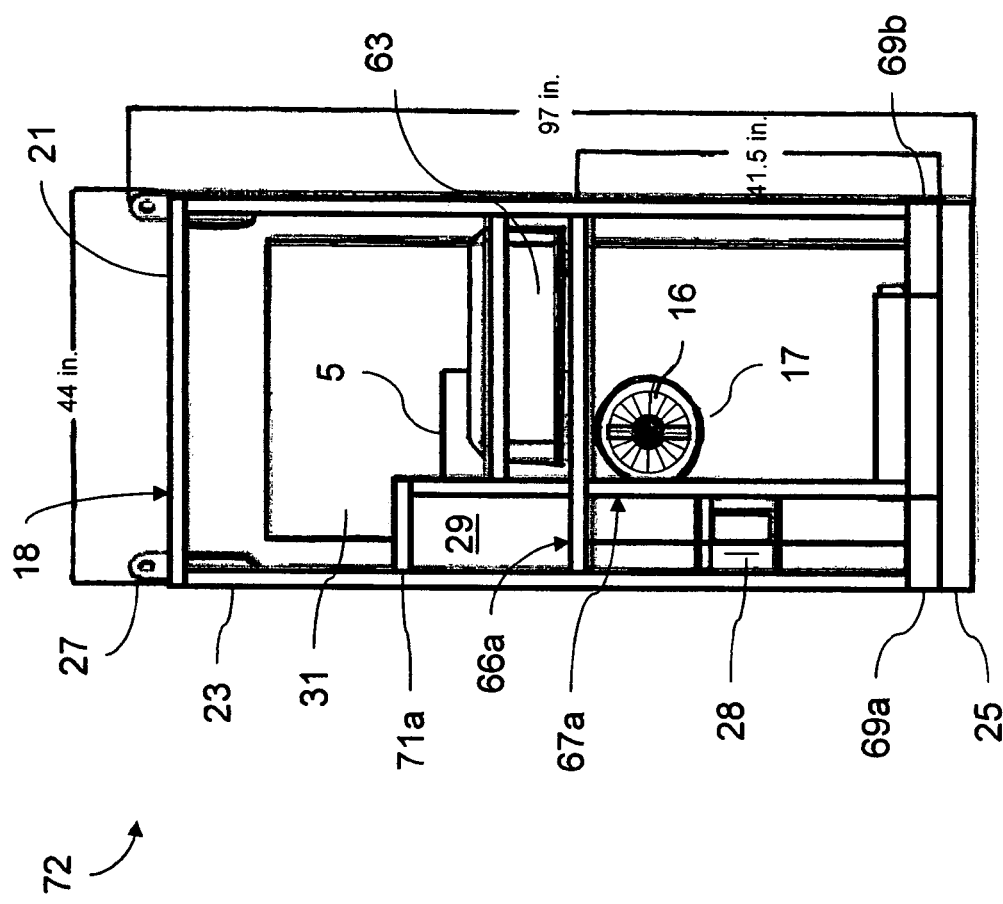
FIG. 7 is a schematic diagram elevation view of the airflow process inlet and outlet side including the high static direct drive axial type blower, shown in FIG. 1.
Figure 8:
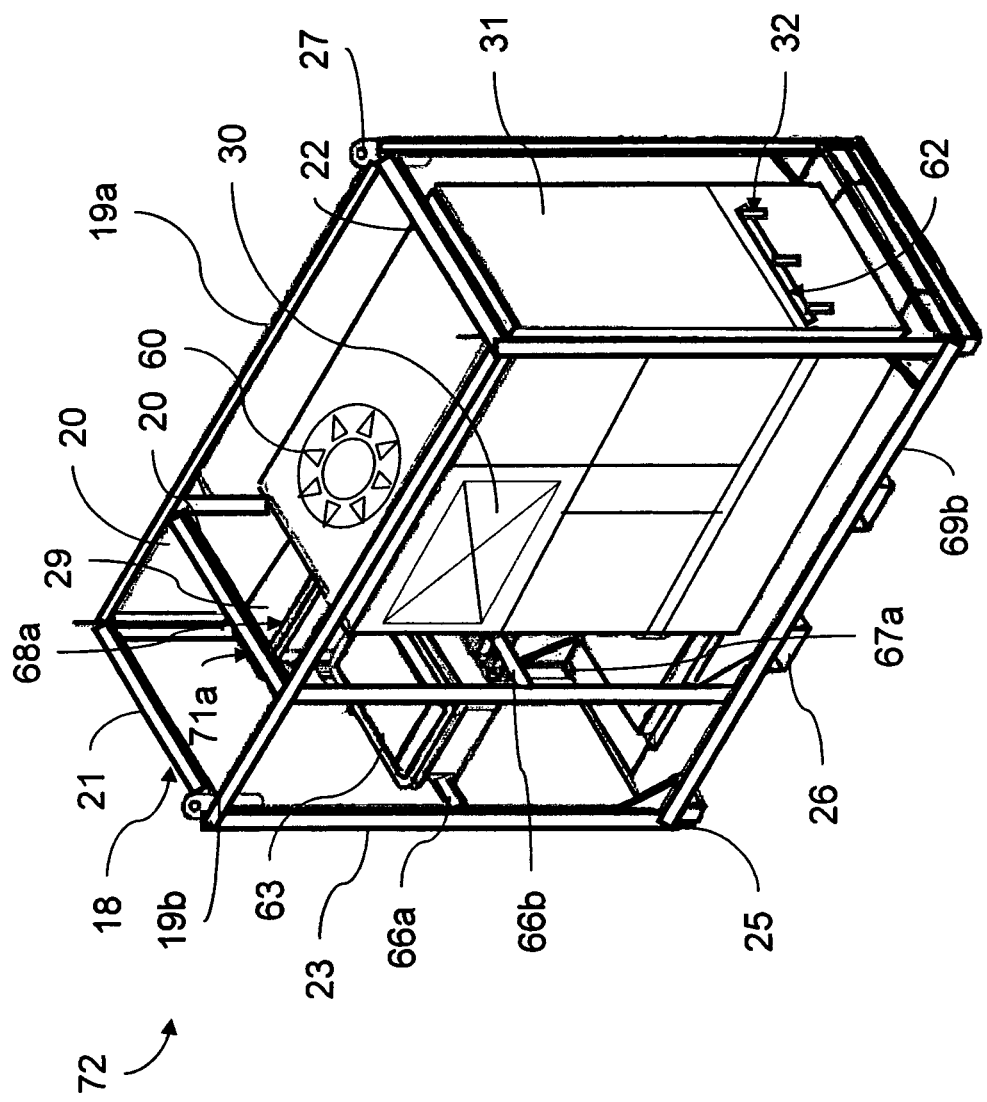
FIG. 8 is a schematic diagram perspective view shown in FIG. 1.
Figure 9:
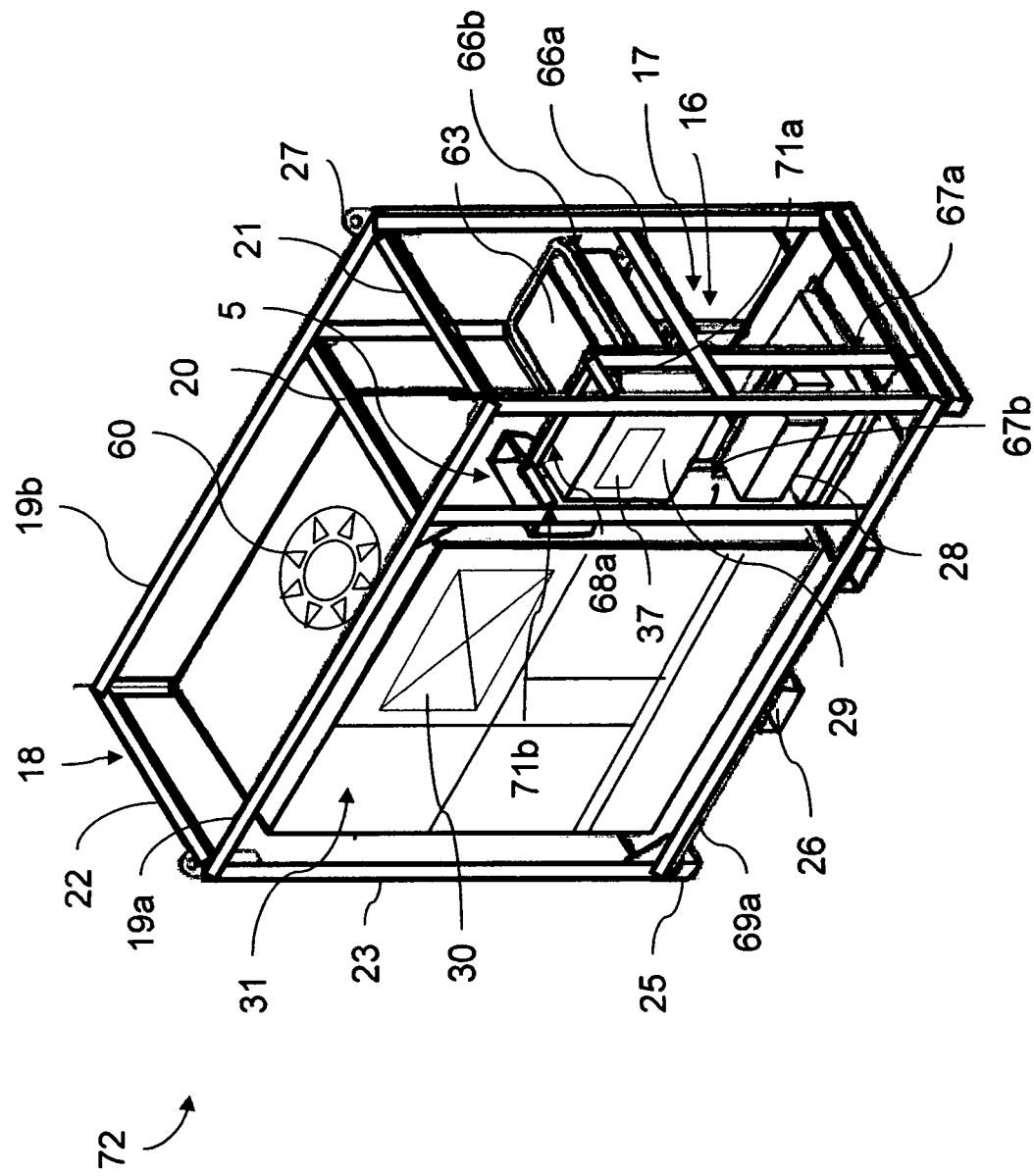
FIG. 9 is a schematic diagram perspective view shown in FIG. 1.

This frame is constructed from several structural members assembled from top to bottom as; longitudinal beams 19a FIGS. 3, 8, 9, 19b FIGS. 8, 9, longitudinal base beam 69 FIGS. 3, 7, 8, 9, transversal beams 20, 21 and 22 FIGS. 3, 7, 8, 9, vertical posts 23 FIGS. 3, 7, 8, 9, and diagonal brace members 24 FIGS. 3, 8, 9.

The control and electrical section is also supported by; electrical panel and (PLC) programmable logistic controller, transversal beams 66a, FIGS. 7, 8 and 9. 66b FIGS. 8, 9, vertical posts 67a FIGS. 7, 8, 9, 67b FIG. 9, longitudinal beams 68a FIGS. 3, 8, 9, 68b FIG. 3, longitudinal base beams 69a FIGS. 3, 7, 9, 69b FIGS. 7, 8, and transversal beams for PLC panel 71a FIGS. 7, 8, 9, and 71b FIG. 9. The frame 18 FIGS. 3, 4, 7, 8, 9 also includes two base feet 25 FIGS. 3, 7, 8, 9, located at both ends for positioning on a structural support surface as well as two sleeve channels 26 FIGS. 3, 8, 9, located in the base center for fork lifting and four corner lifting points 27 FIGS. 3, 7, 8, 9, located at the top corners of the frame for inserting the hooks of a sling assembly to enable manipulation and displacement on a roof, floor or platform. The PH2OCP system various operational mechanical components and sub-systems are enclosed and shielded within a rectangular shaped cabinet 31 FIGS. 3, 7, 8, 9, with several access panels unit views 1, 2, 3, 4, FIGS. 1 and 33a, b, c, d, e, f, g, h, FIG. 3, to enable penetration into the various system compartments for periodic verification and maintenance of PH2OCP system 72 components. The PH2OCP system 72 side walls as illustrated on unit views 3 and 4 FIGS. 1 and 33a to h, FIG. 3, have duplicate access panels which are symmetrical on both side walls. This allows for easier access and maintenance by enabling accessibility to the various operational compartments on either side of the cabinet 31.

In the preferred embodiment, the PH2OCP system 72 frame 18 and overall cabinet 31 are preferably constructed of stainless steel or aluminum in order for the metal surfaces to prevent rust accumulation, corrosion and deterioration even when used in abrasive environments, such as offshore marine applications or at sites located in proximity to salt laden ocean water. In an alternate but limited to the embodiment, an epoxy coated resistant steel frame 18 and cabinet 31 type construction may also be used. Therefore, the PH2OCP system FIG. 1 unit views 1, 2, 3 and 4, is well supported by this frame structure 18 FIGS. 3, 4, 7, 8, 9 benefits from enhanced and secured portability in all environments and locations. It can be transported and deployed with ease to various temporary or permanent work sites, remote locations and distant facilities which have limited or no accessibility to sources of water.

As shown in FIGS. 1, 3, 4, 7, 8 and 9 the frame 18 is open to thereby facilitate and enable access to the overall cabinet 31 FIGS. 3, 7, 8, 9, the control and electrical panels 28, 29, 63 FIGS. 3, 4, 7, 8, 9, of the PH2OCP system in order to verify the components and perform routine maintenance checks and repairs. However it must be understood that in an alternative embodiment, the entire frame 18 and cabinet 31, could be covered with an outer shell or walls which would encapsulate and form an enclosure which would be designed and adapted to house the PH2OCP system as well as its operating components and sub-systems such as; desiccant rotor/wheel assembly, microwave reactivation system, air treatment and conditioning system as well as control and electrical panels as described and illustrated in FIG. 1 to 9.

The construction of such an enclosure would definitely provide the PH2OCP system components with additional protection and limiting access for reasons of security dependent upon where the PH2OCP system may be required to operate. This enclosure (not shown) constructed and surrounding the PH2OCP system frame 18 and cabinet 31 would be designed for adaptation to the PH2OCP system functionality. To further elaborate on the use of this new technology; deployment and operation of the PH2OCP system FIG. 1 unit views 1, 2, 3 and 4, in any climatic or environmental conditions, will guarantee to provide maximum moisture vapor extraction for ultimate water production.

Figure 2:
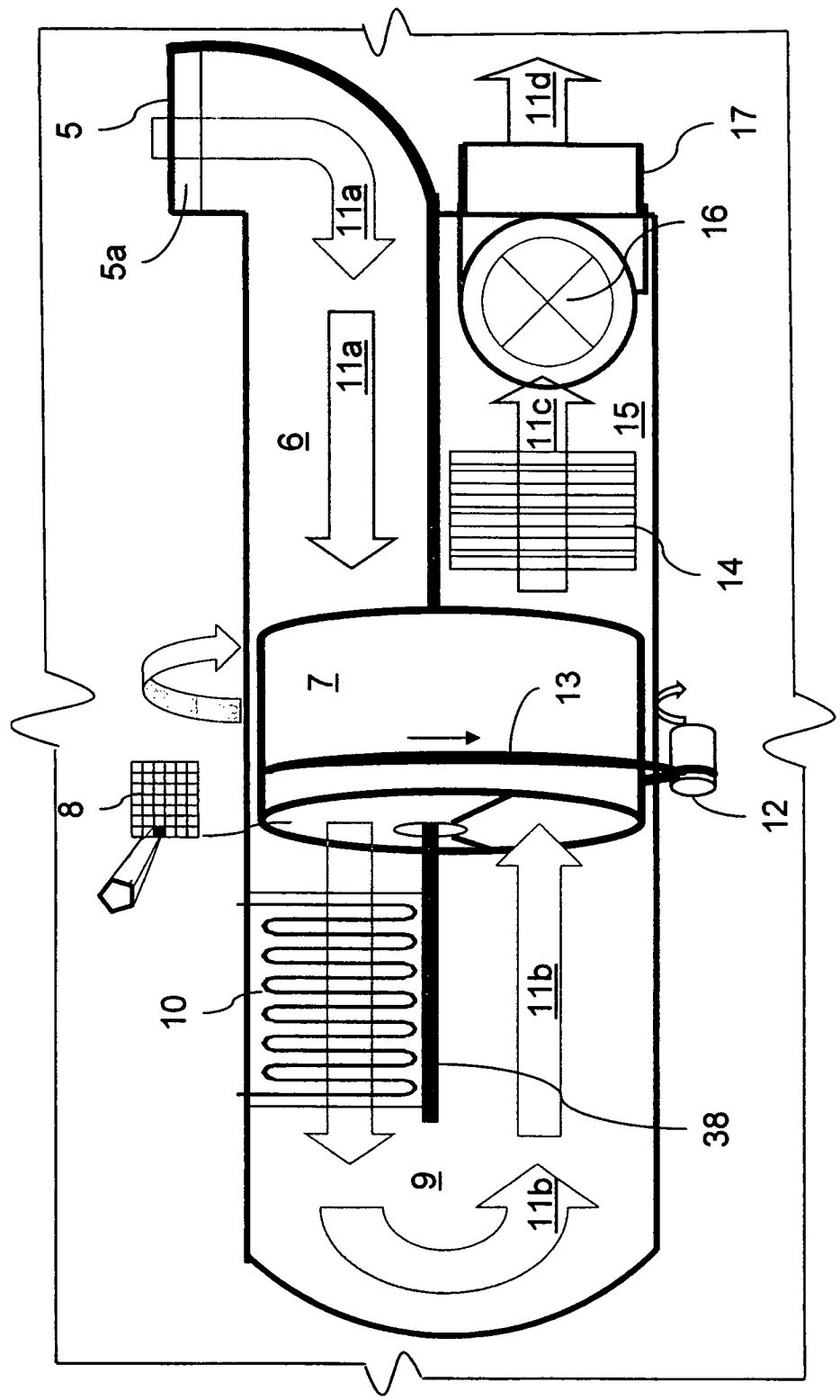
FIG. 2 is a schematic diagram sectional view of the (PH2OCP) Portable Water and Climatic Production system processes such as the; extraction, reactivation and condensation shown in FIGS. 4, 5, and 6. The view depicts the typical air flow movement drawn by the high static blower through the desiccant rotor/wheel during operation with the electric drive motor provided for the rotation of the desiccant rotor/wheel (not to scale). This will also be identified as the Front Page View.
Figure 4:
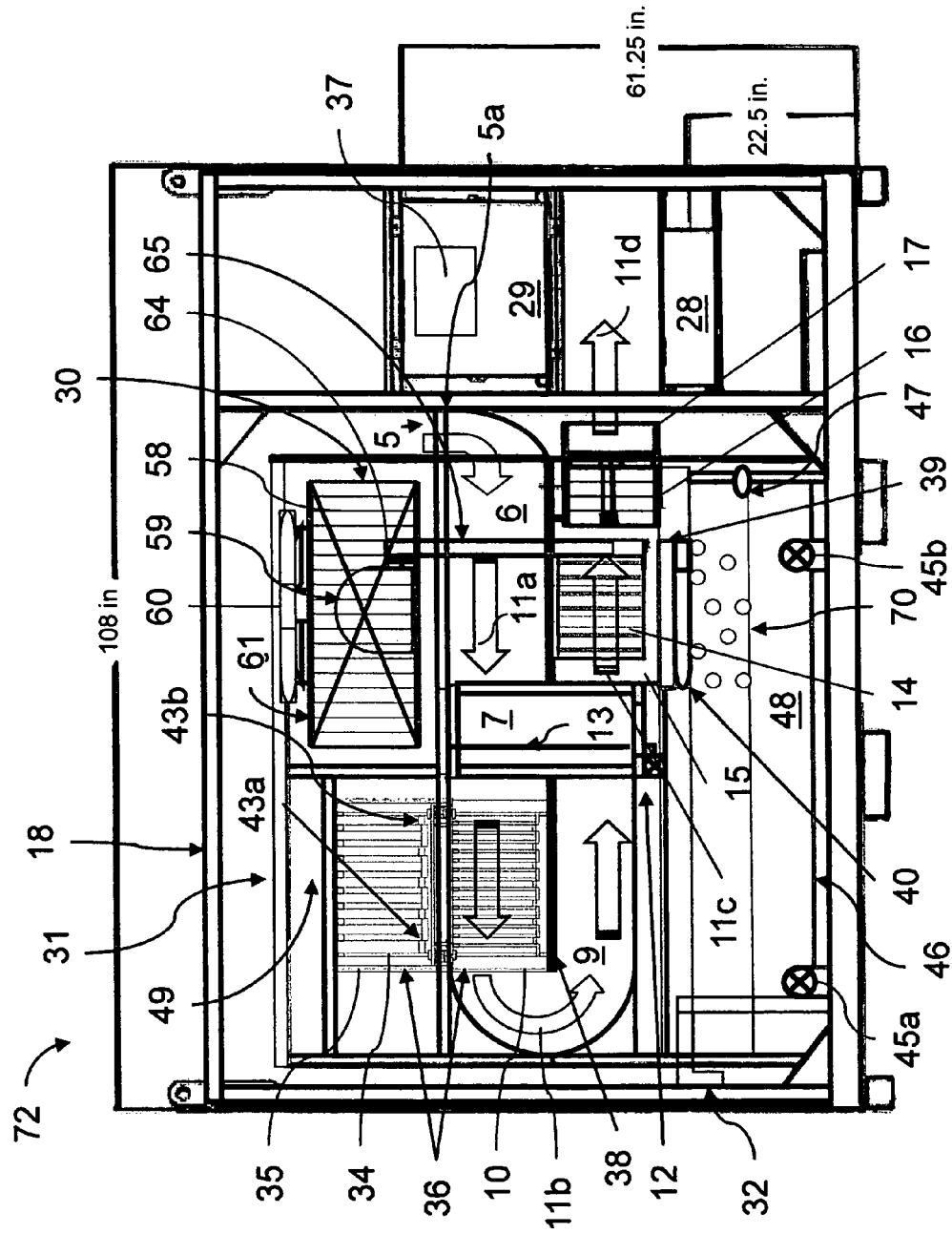
FIG. 4 is a schematic diagram full sectional view of the (PH2OCP) Portable Water and Climatic Production system cabinet shown in FIGS. 1 and 3 with the various operational sections and processes exposed; extraction process, desiccant rotor/wheel assembly, reactivation process including the microwave reactivation system and finally the condensation process which includes the air treatment and conditioning system (not to scale)
Figure 5:
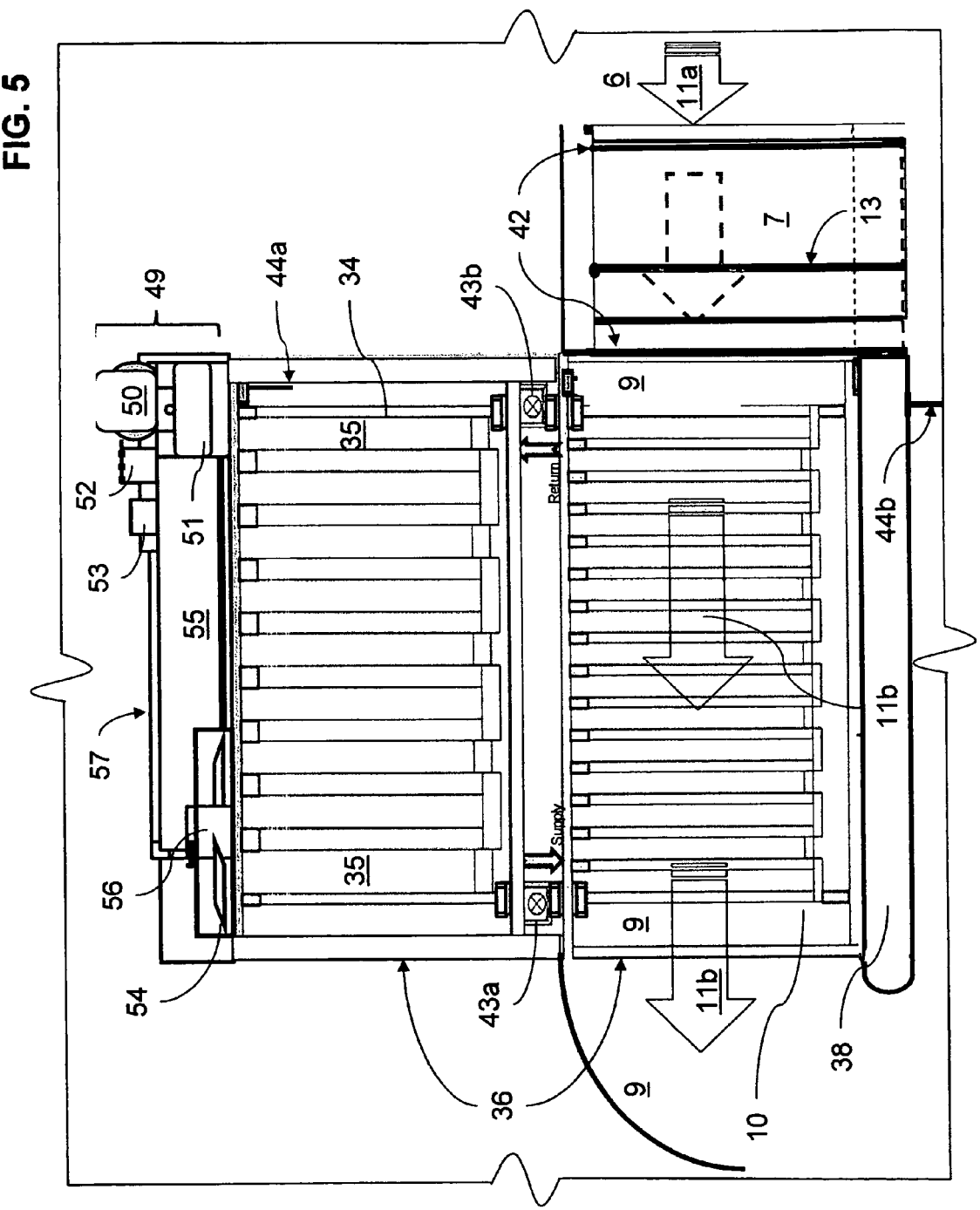
FIG. 5 is a schematic diagram sectional view of the PH2OCP system's sub-system identified as the microwave reactivation system and the closed-loop coil assemblies' construction. The microwave heating chamber coil assembly is connected via two oppositely located thermal fluid circulation pumps to the reactivation process coil assembly shown also in FIGS. 4 and 6, along with some of the major operational components such as; capacitor, diode, high voltage transformer, magnetron, stirrer blades and wave guide (not to scale)
Figure 6:
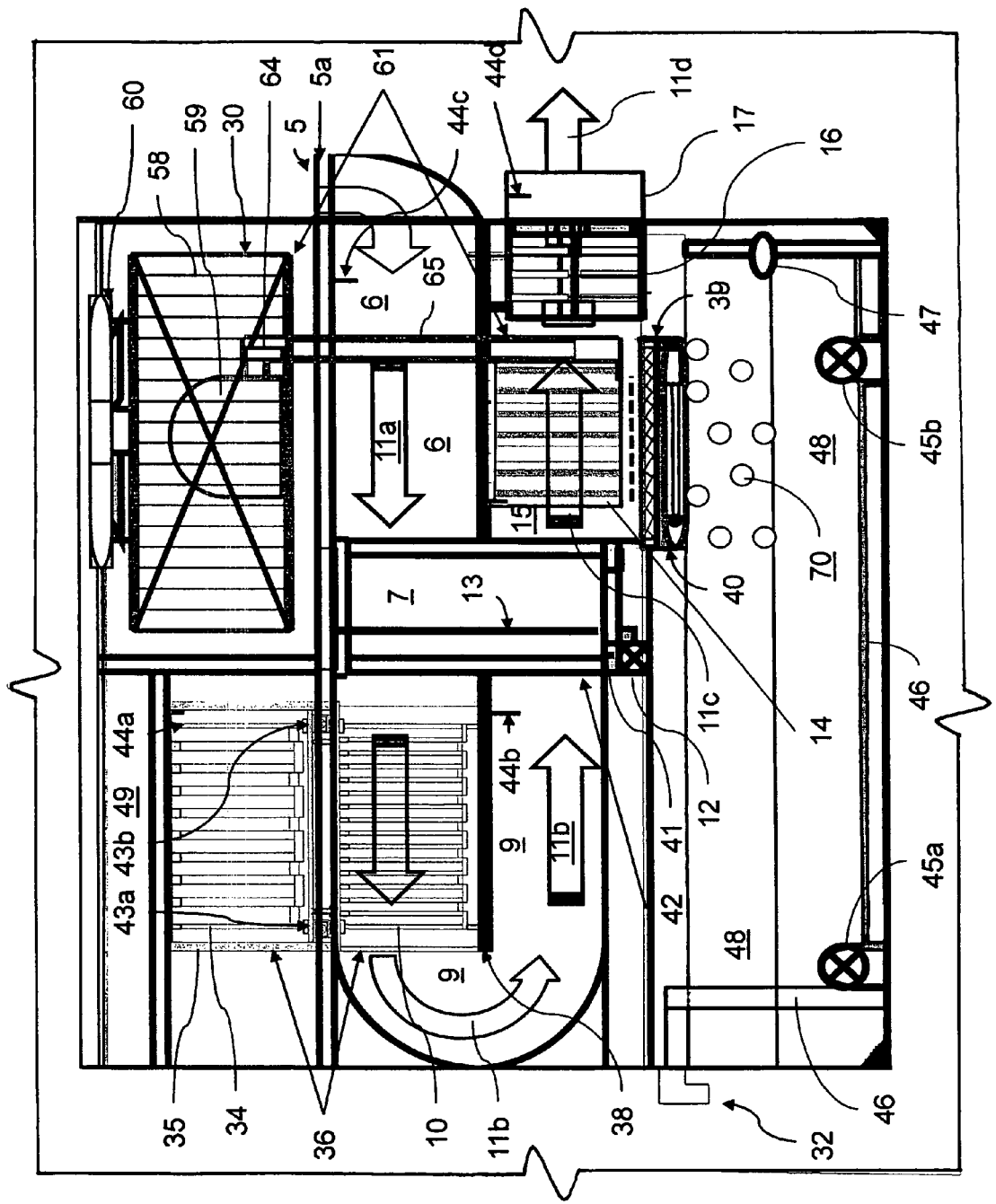
FIG. 6 is a schematic diagram sectional view of the PH2OCP system's sub-system identified as the air treatment and conditioning system. The construction is of a split type assembly where the compressor, condenser coils including metering device and valves are mounted above the extraction process section and the evaporator cooling coils are mounted below in the condensation process section, both linked by refrigerant gas piping, shown in FIG. 4.

In addition, by incorporating effective and efficient components and sub-systems in the PH2OCP system, such as; the desiccant rotor/wheel technology 7, the microwave reactivation system 36 within the reactivation process 9 FIGS. 2, 4, 5, 6, and the air treatment and conditioning system 61 within the condensation process 15 FIGS. 2, 4, 6, allow for enormous reduction of electrical power requirement and consumption while using the desiccant rotor/wheel technology without compromising on the system's performance and capabilities of water production. This important addition of the microwave reactivation system 36 as part of the reactivation process 9, enables the capabilities of substantial energy reduction and savings without compromising on the benefits and advantages of the PH2OCP system 72 to effectively transform moisture vapors into usable water, even in areas, applications and sites with power supply availability limitations.

In reference to the PH2OCP system 72 internal construction FIGS. 2, 4, 5, 6, demonstrate the processes, sub-systems and components of the PH2OCP system 72 FIG. 1. There is included an extraction process section 6 with a desiccant rotor/wheel assembly 7, a reactivation process section 9 with a microwave reactivation system 36 which incorporates a microwave heating chamber 35 and reactivation heating coils 34. Finally there is a condensation process section 15 with an air treatment and conditioning system 61 split design incorporating the evaporator cooling coils assembly 14 which is linked to a compressor 59 FIGS. 4, 6, condenser coil assembly, 58 FIGS. 4, 6, exhaust fan and motor assembly 61 FIGS. 4, 6, 8, 9, metering valve 64 FIGS. 4, 6, and components (not shown). The PH2OCP system 72 process airflow 11a, b, c and d FIG. 2, is maintained by means of a high static direct drive axial type blower and motor assembly 16 FIGS. 2, 4, 6, 7, located at the process outlet 17 FIGS. 2, 3, 4, 6, 7 and 9.

The (PH2OCP) Portable Water and Climatic Production system 72 processes and operation will now be explained in greater detail. The ambient airflow 11a FIGS. 2, 4, 6, is drawn into the process inlet 5 FIGS. 2, 3, 4, 6, 7, 9, by means of a high static direct drive axial type blower and motor assembly 16 FIGS. 2, 4, 6 and 7. This high static blower and motor assembly 16 is located in the process outlet 17 FIGS. 2, 3, 4, 6, 7, 9 and maintain both airflow pressure and velocity through the PH2OCP system 72. The process airflow 11a, b, c, d, FIG. 2 is then drawn through the first section called the extraction process 6 FIGS. 2, 4, 5, 6, which is intended to perform the collection and retention of the moisture/water vapors found in the ambient air.

The desiccant rotor/wheel assembly 7 FIGS. 2, 4, 5, 6, construction includes a desiccant core material 8 FIG. 2 impregnated with silica gel which collects and retains the moisture vapors. The resultant dry airflow 11b FIGS. 2, 4, 5, 6, is drawn into the second section called the reactivation process 9 FIGS. 2, 4, 5 and 6. In the reactivation process 9, this dry airflow comes in contact and is heated by the reactivation heating coils 10 part of the microwave reactivation system 36 FIGS. 2, 4, 5 and 6. The microwave reactivation system 36 is comprised of a microwave heating chamber 35 and reactivation heating coils 10 FIGS. 2, 4, 5, 6 having each their segregated series of hollow serpentine coils assemblies FIGS. 4, 5, 6; glass ceramic 34 and metallic 10, having an internal heated thermal fluid (not shown) which flows through them.

These coil assemblies 34 and 10 FIGS. 4, 5, 6, though segregated are interconnected by means of two circulation pumps 43 FIGS. 4, 5, 6, as part of a closed-loop circuit. One glass-ceramic coils assembly 34 FIGS. 4, 5, 6, is constructed and located separately within the microwave heating chamber 35 FIGS. 4, 5, 6, above the reactivation process section 9 FIGS. 2, 4, 5, 6. The other metallic coils assembly 10 FIGS. 2, 4, 5, 6, is constructed and located in the reactivation process 9 FIGS. 2, 4, 5, 6, directly in the pathway of the dry airflow 11b FIGS. 2, 4, 5 and 6. The thermal fluid (not shown) is super heated as it is pumped through the glass-ceramic coil assembly 34 in the microwave heating chamber 35 and into the metallic coil assembly 10 in the reactivation process section 9.

The high heat radiated from the thermal fluid (not shown) pumped in the reactivation process 9 metallic coils assembly 10 is transferred onto the dry airflow 11b, substantially raising the airflow temperature before coming in contact with the desiccant core material 8 within the desiccant rotor/wheel assembly 7 FIGS. 2, 4 and 6.

As the super heated dry airflow 11b is drawn through the system passing through the desiccant rotor/wheel assembly 7 and perforated desiccant core material 8, this airflow effectively deactivates the moisture laden desiccant core material 8, enabling it to release all the moisture vapors back into the hot airflow 11c FIGS. 2, 4 and 6. This moisture saturated hot airflow 11c FIGS. 2, 4, 6, is then drawn, leaving the desiccant rotor/wheel 7 and core material 8 FIGS. 2, 4, 6, transporting the water vapors through the third section which is called the condensation process 15 FIGS. 2, 4 and 6. In the condensation process section 15, the moisture saturated hot airflow 11c transports the water vapors passing through an evaporator cooling coils assembly 14 FIGS. 2, 4, 6, part of the air treatment and conditioning system 61 FIGS. 4 and 6. The wet airflow temperature is rapidly cooled and as a resultant producing condensate which transforms into water 70 FIGS. 4 and 6. This water 70 is gravity fed to a base funnel (not shown) located directly beneath the evaporative cooling coils assembly 14, which directs the water stream downward towards the system reservoir 48 FIGS. 4, 6, located at the base of the PH2OCP system 72. In the preferred embodiment, the condensate which is transformed into water 70, is directed through a water sanitization process which occurs directly beneath the condensation process section 15.

This water sanitization process incorporates an active carbon filter 39 and ultraviolet (UV) lamps assembly 40 FIGS. 4, 6, for decontamination, located right below the evaporator cooling coils assembly 14 in the condensation process section 15 FIGS. 2, 4 and 6. This would ensure that any existing contaminants, particles and bacteria have been removed and destroyed in order to provide the resultant which is sanitized, clean and potable water. In the preferred embodiment, the components such as the carbon filter 39 and ultraviolet UV lamps assembly 40 FIGS. 4, 6, that make up the water sanitization process are accessible through one of the cabinet 31 access panel 33f FIG. 3. These components are also replaceable, in order to upkeep and optimize on the PH2OCP systems' water cleansing and purification capabilities when the resultant must be for use as potable water. In an alternative embodiment, other water cleansing filters may be used depending on the environmental requirements.

In the preferred embodiment, a single or superimposed twin carbon filter 39 pack is installed coupled with a "High Output Germicidal UV" type lamps assembly 40 (not shown) incorporate industrial grade lamps and tubing construction. This high output germicidal (UV) ultraviolet lamps assembly 40 provides high (UV) ultraviolet output over a great temperature spectrum, it has a long operational life and excellent sterilization capabilities which are required for operation within the PH2OCP system 72. This UV lamps assembly 40 is available in different sizes and may be operated either from a single transformer or in series through the medium of high voltage transformers.

The treated and conditioned dry airflow 11*d* FIG. 2 #, FIGS. 2, 4, 6, which is void of water vapors is then drawn through the high static direct drive axial blower 16 FIGS. 2, 4, 6, 7, located in the process outlet 17 FIGS. 2, 3, 4, 6, 7, 9, discharging it to the ambient atmosphere. This treated airflow 11*d* is a useful byproduct, which can then be used for conditioning of an enclosure or space. An electronic control panel (PLC) or more specifically a programmable logistical controller 29 FIGS. 3, 4, 7, 8, 9, is responsible for governing and synchronizing the operations of the various PH2OCP subsystems including all components.

The PLC control panel 29 also governs the operation of the desiccant rotor/wheel assembly 7 and rotation motor assembly 12 FIGS. 2, 4, 6, which are two of the main operational components of the PH2OCP system 72. The electrical panel 63 FIGS. 7, 8, 9, the (PLC) programmable logistical controller 29 FIGS. 3, 4, 7, 8, 9, and plug-in power cable connector panel 28 FIGS. 3, 4, 7, 9, are housed in generally square or rectangular design water resistant protective enclosures. The PLC panel 29 has a hinged lid and screw type fasteners and angles at various points for attachment and tight sealing of the lid. The electrical panel 63, PLC panel 29 and the plug-in power cable connector panel 28 protective type enclosures can be designed to adapt to the various operational environments of the PH2OCP system 72. In the preferred design, the PLC panel 29, electrical panel 63, and plug-in power cable connector panel 28 are constructed of either stainless steel or of aluminum.

Referring to FIGS. 2, 3, 4, 5, 6, the PH2OCP system 72 desiccant rotor/wheel assembly 7 is housed in a rectangular box shaped cabinet 31 FIGS. 1, 3, 7, 8, 9, and accessible through a panel 33*c* FIG. 3, supported on cross members (not shown).

In the preferred embodiment, the cabinet 31 is constructed from stainless steel to resist corrosion or from welded aluminum, coated with a durable resistant enamel or air-dry polyurethane corrosion resistant paint. The cabinet 31 FIGS. 1, 3, 7, 8, 9, includes top and bottom walls, front and rear spaced walls and opposed side walls as shown. As shown in FIG. 1 unit views 1, 2, 4, FIGS. 3, 7, 9, adjacent the bottom wall, the front wall has the air process inlet 5 (above) FIGS. 2, 3, 4, 6, 7, 9, and air process outlet 17 (below) FIGS. 2, 3, 4, 6, 7 and 9. The process inlet 5 is to allow ambient air 11*a* FIGS. 2, 3, 4, 6, 7, 9, to flow into the PH2OCP system 72 through the extraction process section 6 FIGS. 2, 4, 5, 6, and the desiccant rotor/wheel assembly 7 FIGS. 2, 4, 5 and 6. In the preferred embodiment, mounted at the intake of the process inlet, there could be installed an inlet filter 5*a* FIG. 2 for removing airborne contaminants or dust particles found in the ambient air, prior to it entering the extraction process section 6 FIGS. 2, 4, 5, 6, and flowing through the desiccant rotor/wheel 7 perforated desiccant core material 8 FIG. 2.

The filter installation tends to prevent the dust particles from accumulating within the PH2OCP system 72 and clogging the desiccant rotor/wheel core material 8 FIG. 2 which could if exposed long term, affect the performance and overall operating PH2OCP system 72.

In the preferred embodiment, the process inlet 5 filter 5*a* is a metallic mesh filter which is washable and can be removed for cleaning and rinsing of dust particles and reinstalled. As also shown in view 2 FIG. 1, the front wall also has a process outlet 17 dry air discharge 11*d*. This discharged airflow 11*d* permits the PH2OCP system 72 to provide as a byproduct not only dry but conditioned air as well that can be utilized to climatize an enclosure or space. Mounted in the process outlet 17 there can be installed a manually operated damper assembly (not shown) including at least (1) one or more rotating louvers for selectively restricting the air flow out of the process outlet 17. The use of this feature can increase both air pressure and temperature to enable greater heat retention within the reactivation process section 9 which will in turn increase the efficiency of the desiccant rotor/wheel 7 and core material 8. The temperature rise speeds up the release of moisture vapors in the condensation process section and drying out the desiccant core material 8 so that it can resume its operating cycle as it rotates back into the extraction process section 6. Therefore, depending on the climatic conditions, this mechanical feature found in the PH2OCP system 72 could be beneficial in allowing the desiccant core material 8 within the desiccant rotor/wheel 7 to release greater quantities of accumulated moisture and thus increasing its water production capability as required. In the preferred embodiment, constant airflow 11*a*, *b*, *c*, *d*, and pressure is provided and maintained by means of (1) one high static direct drive axial type blower 16 driven by an electric motor (not shown) FIGS. 2, 4, 6, 7, which is located at the process outlet 17 installed and secured within the casing.

The process outlet 17 high static direct drive axial blower 16 allows for the discharge of the dry conditioned airflow 11*d* which is drawn through the PH2OCP system 72 processes and directly into the enclosure or space to be treated and conditioned. Mounted in the process outlet 17 there can be installed a manually operated damper assembly (not shown) including at least (1) one or more rotating louvers for selectively restricting the air flow out of the process outlet 17 (dry conditioned air supply 11*d*) to the enclosure or space when required.

In alternative embodiments, if a larger PH2OCP system 72 design with greater airflow and pressure is required for increased water production capability, there may be installed (2) two high static direct drive axial type blowers, one located at the process inlet 5 and the other at the process outlet 17. This design could ensure that in a larger system design increased airflow and pressure requirements would be maintained as well as system continuity and redundancy in case one of the two blowers would cease operation.

However it will be appreciated and understood that the electric motor (not shown) which drives the PH2OCP system 72 high static direct drive axial type blower 16 need not necessarily be an electric type motor. In alternative embodiments, there may be installed either a hydraulic, pneumatic or steam driven motor, designed and approved, which could be utilized to accomplish the same task of driving the PH2OCP system 72 process high static axial blower 16. The process outlet 17 supply port has an extension which is adapted to receive flexible or rigid ducting to allow distribution of conditioned dry air to specific target areas to be treated. As shown in FIG. 1 unit views 1, 3, 4, FIGS. 3, 8, 9, that each of the side walls have outer access panels 33*a* to *h*, which are constructed and symmetrical on both sides of the cabinet 31 and can be attached to the cabinet with bolt and clip nut assemblies (not shown) or equipped with latch assemblies (not shown) which unlock and permit panel opening for easy access during servicing and maintenance without having to disassemble or disconnect any air distribution ducting or electrical power supply cables. These various panels 33*a* to *h*, enable quick access to all the unit compartments which house the PH2OCP system 72 operational sub-systems and related components, such as; extraction process section 6, desiccant rotor/wheel assembly 7, the reactivation process section components 9, the condensation process section 15 components including the filtration and decontamination package 39 and 40.

All of these access panels may be designed and provided with a small window (not shown) in order to allow for visual inspection, including but not limited to the various operational sub-systems and components. With reference to the desiccant rotor/wheel assembly 7 FIGS. 2, 4, 5, 6, it is mounted within the cabinet 31 FIG. 3 in access panel 33*c* FIG. 3, between two interior walls thereof as shown on FIGS. 4, 6, (not shown) which are located fwd and aft of the desiccant rotor/wheel assembly 7 FIGS. 4 and 6. The desiccant rotor/wheel assembly 7 includes the desiccant rotor/wheel 7 supported on a set of roller bearings (2) assemblies 41 FIG. 6, one on either side at the base of the desiccant rotor/wheel assembly 7 FIG. 6 on which the desiccant rotor/wheel 7 rests during rotation and operation.

In the preferred embodiment, there is an electric drive rotation motor 12 FIGS. 2, 4, 6, which provides for driving rotation of the desiccant rotor/wheel assembly 7 along its longitudinal axis. The electric drive rotation motor is encapsulated within a housing (not shown). In an alternative design adapted for some applications, the electric drive rotation motor may include an internal ventilation fan for cooling the drive motor. Though the preferred embodiment demonstrates the use of an electric drive rotation motor 12, it must be appreciated that in other alternative embodiments, the drive rotation motor 12 could be powered and driven pneumatically or hydraulically in order to perform the same function. The electric drive rotation motor 12 is connected to the desiccant rotor/wheel assembly 7 by way of a gearbox (not shown) which in turn drives a self-tension drive belt 13 arrangement FIGS. 2, 4 and 6. The gearbox (not shown) provides for drive motor speed to be reduced allowing for the specified desiccant rotor/wheel assembly 7 rotations to be achieved. In the preferred embodiment, the desiccant rotor/wheel assembly 7 FIGS. 2, 4, 5, 6, is driven to operate between 8 to 10 complete rotations per hour. The rotations could vary according to the type of desiccant core material 8, diameter and thickness of the desiccant rotor/wheel 7 as well as the specific applications where it may be utilized. The electric drive rotation motor 12 is connected by means of an electrical cable to a junction box (not shown). The junction box electrical cable runs through an electrical conduit (not shown) within and down the cabinet 31 through the frame 18 base longitudinal beam 69*a* and up the vertical post 23 where it is connected to the PLC programmable logic control panel 29 for protection from the external elements.

This electrical conduit (not shown) houses the PH2OCP systems' insulated electric cables and wires (not shown). In an alternative embodiment, it must be appreciated that the electrical conduit system which houses the electrical cables and wiring may be designed and housed externally on the unit frame 18. As best demonstrated in FIG. 2, the desiccant rotor/wheel assembly 7 includes an outer metal shell or casing and a monolithic core which is the desiccant material 8. In the preferred embodiment the outer casing or shell of the desiccant rotor/wheel 7 is made of aluminum, however, it will be appreciated that in alternative embodiments other alloys or metals could also be used in the fabrication of the desiccant rotor/wheel 7 outer shell or casing. The core of the desiccant material as shown in 8 FIG. 2, is perforated and has a matrix made up of small uniformed tunnels or channels with the walls shaped resembling a honeycomb. These small uniformed tunnels run parallel to the axis of the process airflow 11*a*, *b*, *c*, *d*, which moves through the three processes; extraction 6, reactivation 9 and condensation 15. The desiccant core material 8 FIG. 2, tunnel walls are constructed of a non-metallic, non-corrosive inert composite. The walls are made of extruded fiberglass paper fibers with an opening measuring at least 5 microns in diameter and are coated/impregnated with a solid desiccant type material which in the preferred embodiment will be, but not limited to; silica gel. Other desiccant materials which will not contaminate the water may be used such as molecular sieve, including other types of desiccant materials which can withstand repeated temperature fluctuations and moisture retention and release cycling. The desiccant type material is evenly spread throughout the core 8 FIG. 2 of the desiccant rotor/wheel assembly 7.

In the extraction process 6, the desiccant core material 8 FIG. 2 vapor moisture content is very low and dry therefore attracting airborne moisture vapors extracting them from the process inlet 5 airflow 11*a* called sorption. In this process section the desiccant core material 8 has a very low vapor pressure/very low moisture concentration in comparison to the damp and humid ambient incoming process inlet 5 airflow 11*a*. Conversely, in the reactivation process section 9, the desiccant core material 8 will release its accumulated moisture vapors back into the hot dry process airflow 11*b* as it passes through called desorption.

This is made possible because under the conditions produced, the desiccant core material will have a high vapor pressure/higher moisture concentration in comparison to the process airflow 11*b*. The desiccant rotor/wheel assembly 7 FIGS. 2, 4, 5, 6, is considered to be an active component because it performs its tasks of sorption and desorption by continuously rotating about its longitudinal axis, passing through the extraction 6, reactivation 9 and condensation 15 processes and back again as part of a perpetual cycle. The alternating cycle from high to low vapor pressures such as the extraction 6 and reactivation 9 processes, enable the PH2OCP system 72 the capability to absorb and release enormous quantities of moisture vapors from ambient airflow 11*a, b, c, d*, FIG. 2. In the preferred embodiment, the PH2OCP system 72 uses reactivation process 9 airflow 11*b* which is heated by the reactivation heating coils 10 part of the sub-system identified as the microwave reactivation system 36 FIG. 2 located within the reactivation process section 9.

This heated reactivation process 9 airflow 11*b* demagnetizes the desiccant core material 8 within the desiccant rotor/wheel assembly 7 FIG. 2. The desiccant core material 8 when heated at a high temperature looses its capacity to retain moisture vapors therefore releasing and discharging them back into the process airflow 11*c*. Because the moisture removal in the desiccant rotor/wheel 7 occurs in the vapor phase, there is no liquid condensate. Therefore, the PH2OCP system 72 can continue to extract moisture vapors from the extraction process 6 airflow 11*a*, even when the dewpoint of the process airflow 11*a* is below freezing. Consequently, in comparison to the conventional moisture extraction systems, the PH2OCP system 72 is much more operationally versatile, able to fully function and completely adaptable in various environmental and climatic conditions found around the globe. In the preferred embodiment, the desiccant rotor/wheel assembly 7 installed and utilized within the PH2OCP system 72 can be constructed and supplied by any approved desiccant rotor/wheel manufacturer which meets the approved equipment performance specifications and industry standards.

In the preferred embodiment, the portion of the desiccant core material 8 of the desiccant rotor/wheel assembly 7 which is reactivated or regenerated FIG. 2, is sectioned off by a V-shaped partition member FIG. 2, which is mounted in the cabinet 31. This V-shaped partition member isolates and segregates a pie-shaped section approximately one-quarter (¼) of the desiccant rotor/wheel 7 core material 8 from the remaining portion of the desiccant core material thereof, which defines the reactivation process section 9 FIG. 2 of the desiccant rotor/wheel assembly 7.

The remaining portion approximately three-quarters (¾) of the desiccant rotor/wheel 7 core material 8 FIG. 2, defines the extraction process section 6 FIG. 2 of the desiccant rotor/wheel assembly 7. In the preferred embodiment, the reactivation process 9 portion of the desiccant rotor/wheel assembly 7 may cover between one-quarter to one third of the surface desiccant core material 8 area of the desiccant rotor/wheel assembly 7. In alternate embodiments, both the extraction 6 and reactivation 9 processes could each cover one-half (50%) of the surface desiccant core material area. During the operation of the PH2OCP system 72, the portions of the desiccant rotor/wheel assembly 7 core material 8 which define the extraction process section 6 FIG. 2 and the reactivation process section 9 FIG. 2, are constantly changing. This occurs as a result of the rotation of the desiccant rotor/wheel assembly 7 FIG. 2, by means of a electric drive rotation motor 12 FIG. 2 which are linked by a rotation belt 13 FIG. 2.

Accordingly, as the portion of the desiccant rotor/wheel assembly 7 core material 8 that is exposed to the extraction process 6 airflow 11a FIG. 2 defines the extraction process section 6 FIG. 2, likewise, the portion of the desiccant rotor/wheel assembly 7 core material 8 that is exposed to the reactivation process 9 airflow 11b FIG. 2, defines the reactivation process section 9 FIG. 2. Only the airflow 11a and 11b from these two processes is introduced into the desiccant rotor/wheel assembly 7 core material 8, inducing a reaction of vapor sorption and desorption. The condensation process section 15 FIG. 2 in turn is solely responsible for the transformation of the process airflow 11c hot moisture vapors into condensate and water 70 FIGS. 4, 6, with the treatment and conditioning of the resulting discharge process airflow 11d FIG. 2.

Passing through three-quarters (75%) portion of the desiccant rotor/wheel assembly 7 FIGS. 2, 4, 5, 6, core material 8 FIG. 2 surface area, the extraction process 6 FIGS. 2, 4, 5, 6, airflow 11a FIGS. 2, 4, 5, 6, is drawn through the process inlet 5 FIGS. 2, 3, 4, 6, 7 and 9. Having transferred its moisture onto the desiccant core material 8 FIG. 2, the process airflow 11b FIGS. 2, 4, 5, 6, continues its path as it is drawn into the reactivation process section 9 FIGS. 2, 4, 5, 6, through a metallic coils assembly identified as the reactivation heating coils assembly 10 FIGS. 2, 4, 5, 6, part of the microwave reactivation system 36 FIGS. 4, 5, 6, which incorporates a circulating super heated thermal fluid (not shown). This dry and heated process airflow 11b FIGS. 2, 4, 5, 6, is then drawn increasing its velocity as it passes through a narrower curved pathway which is redirected back again passing through the V-shaped one-quarter (25%) portion of the desiccant rotor/wheel assembly 7 FIGS. 2, 4, 5, 6, core material surface 8 FIG. 2. This portion of the desiccant core material 8 FIG. 2, being saturated with moisture vapors, releases these vapors back into the dry heated process airflow 11b FIGS. 2, 4, 6, which demagnetizes the desiccant core material 8 FIG. 2 as it passes through it. The process airflow 11c FIGS. 2, 4, 6, leaving the desiccant core material 8 FIG. 2, now saturated with moisture vapors, passes through the condensation process section 15 FIGS. 2, 4, 6, where moisture vapors are rapidly cooled, condensed and transformed into water droplets 70 FIGS. 4, 6, which are funneled downward into a unit base reservoir 48 FIGS. 4 and 6. The resulting process airflow 11d FIGS. 2, 4, 6, which is once again dry and conditioned, is then expelled by means of a high static direct drive axial blower 16 FIGS. 2, 4, 6, 7, 9, located at the airflow discharge process outlet 17 FIGS. 2, 3, 4, 5, 7, 9.

It will thus be understood that though there is only one process airflow 11a to 11d passing through the PH2OCP system 72, as it rotates about its longitudinal axis the desiccant rotor/wheel assembly 7 and core material 8 FIGS. 2, 4, 5, 6, is exposed to completely separate and isolated processes; the extraction process 6, the reactivation process 9 and the condensation process 15. Pressure seals (2) 42 FIGS. 5, 6, mounted fore and aft of the desiccant rotor/wheel assembly 7 FIGS. 5, 6, at the extremities of the outer shell rim and at the edges of V-shaped partition member (not shown), are provided in order to separate and completely isolate the three (3) processes extraction 6, reactivation 9, condensation 15 and eliminate any possible air or moisture crossover leakage within the three (3) operating process sections located in the PH2OCP system 72 cabinet 31 FIGS. 1, 3, 7, 8 and 9. In the preferred embodiment, the frame 18 FIGS. 3, 4, 7, 8, 9, will serve as ground, but it will be appreciated that in other embodiments, an alternative ground system including an electrical ground could be utilized. With reference to FIGS. 2, 4, 5, 6, the PH2OCP system's operational sub-systems; microwave reactivation system 36 FIGS. 4, 5, 6 and air treatment and conditioning system 61 FIGS. 4, 6, will now be described in greater detail. The microwave reactivation system 36 FIGS. 4, 5, 6, provides the means for regeneration and reactivation of the desiccant rotor/wheel assembly 7 FIGS. 2, 4, 6, core material 8 FIG. 2 in the PH2OCP system 72. In the preferred embodiment, the microwave heating chamber 35 FIGS. 4, 5, 6, including the microwave components and high voltage part 49 FIG. 5, as part of the microwave reactivation system 36 FIGS. 4, 5, 6, are encapsulated in an explosion-proof type casing for enhanced operational safety and to avoid harmful exposure.

In an alternative embodiment, these same components can be installed inside an industry standard casing which would be deemed safe for operation. This microwave reactivation system 36 FIGS. 4, 5, 6, produces heat by generating electromagnetic RF waves which passes through materials and fluids, causing the molecules within to move rapidly in excitation, causing atomic motion which generates heat. In the preferred embodiment, the medium used to store and transmit this heat is a synthetic thermal fluid (not shown) located in the hollow coils assembly 34 and 10 FIG. 5 of the microwave reactivation system 36 FIGS. 4, 5, 6 closed-loop circuit. This fluid is moved by means of a supply pumps 43a FIGS. 4, 5, 6, located in the isolated compartment beneath the microwave heating chamber 35 FIGS. 4, 5 and 6. The thermal fluid flows through a first series of parallel glass ceramic coils assembly 34 FIGS. 4, 5, 6, located in the microwave heating chamber 35 FIGS. 4, 5, 6, where the fluid molecules are treated and exposed to electromagnetic waves causing excitation, high temperature rise and heat generation within the thermal fluid (not shown).

This super heated thermal fluid is then pumped and flows through a second series of parallel metallic coils 10 FIGS. 2, 4, 5, 6, located in the isolated compartment below directly in the pathway of the process airflow 11b FIGS. 2, 4, 5, 6, called the reactivation process section 9 FIGS. 2, 4, 5 and 6. The heat transferred onto the process airflow 11b from the hot thermal fluid (not shown) within the series of parallel metallic coils assembly 10 FIGS. 2, 4, 5, 6, in the reactivation process section 9 FIGS. 2, 4, 5, 6 and substantially raises the temperature of the process airflow 11b FIGS. 2, 4, 5, 6, as it comes in contact and passes across the surface of the metallic coils assembly 10 FIGS. 2, 4, 5 and 6. This heated reactivation process 9 FIGS. 2, 4, 5, 6, process airflow 11b FIGS. 2, 4, 5, 6, is then used to deactivate the perforated desiccant core material 8 FIG. 2 within the desiccant rotor/wheel assembly 7 FIGS. 2, 4, 6, as it passes through it. This dry and heated process airflow 11b FIGS. 2, 4, 5, 6, is redirected through the cabinet 31 FIGS. 4, 6 process airflow air tunnel within the PH2OCP system 72 and back to the desiccant rotor/wheel assembly 7 FIGS. 2, 4, 6, where it has a demagnetizing effect on the desiccant core material 8 FIG. 2. This treated reactivation process 9 FIGS. 2, 4, 5, 6 and airflow 11b FIGS. 2, 4, 5, 6, enables the desiccant core material 8 to release onto it the retained accumulated moisture.

This effect greatly lowers the vapor pressure within the desiccant core material 8 FIG. 2, enabling the core material to resume its moisture retention or sorption capabilities as it rotates back into the extraction process section 6 FIGS. 2, 4, 5 and 6. The hot and moisture saturated process airflow 11c FIGS. 2, 4, 6, is drawn into the condensation process section 15 FIGS. 2, 4, 6, for air treatment and conditioning. In the preferred embodiment, the microwave reactivation system 36 FIGS. 4, 5, 6, power generation is divided into two parts, the control part and the high-voltage part. The control part is the programmable logic controller (PLC) 29 FIGS. 3, 4, 7, 8 and 9. The PLC 29 controls and governs the power output and desired operational settings, monitors the various system functions, interlock protections and safety devices. Also in the preferred embodiment, to ensure operational safety, the components in the high-voltage part 49 FIG. 5, are encapsulated in an explosion-proof rated housing. These components serve to step up the voltage to a much higher voltage.

The high voltage is then converted into microwave energy in the microwave heating chamber 35 FIGS. 4, 5 and 6. Generally, the control part (not shown) includes either an electromechanical relay or an electronic switch called a triac (not illustrated). Once the system is turned on, sensing that all systems are "go," the control circuit in the programmable logic controller panel 29 generates a signal that causes the relay or triac to activate, thereby producing a voltage path to the high-voltage transformer 50 FIG. 5. By adjusting the on-off ratio of this activation signal, the control part governs the flow of voltage to the high-voltage transformer 50 thereby controlling the on-off ratio of the tube within the magnetron 51 FIG. 5 and therefore the output power to the microwave heating chamber 35 FIG. 5. In the high-voltage part 49 FIG. 5, the high-voltage transformer 50 FIG. 5 along with a special diode 53 FIG. 5 and capacitor 52 FIG. 5 arrangement serve to increase the voltage to an extreme high voltage for the magnetron 51 FIG. 5. The magnetron 51 dynamically converts the high voltage it receives into undulating waves of electromagnetic energy. This microwave energy is then transmitted into a metal rectangular channel identified as a waveguide 55 FIG. 5, which directs the microwave energy or waves into the microwave heating chamber 35 FIGS. 4, 5 and 6.

The effective and even distribution of the electromagnetic energy or waves within the entire microwave heating chamber 35 FIGS. 4, 5, 6, is achieved by the revolving metal stirrer blades 54 FIG. 5, powered by the motor assembly 56 FIG. 5. A metal conduit 57 FIG. 5 houses the electrical wiring between the high voltage part components 49 FIG. 5 to the stirrer blades 54 motor assembly 56 FIG. 5

In the preferred embodiment, high tensile resistant glass ceramic hollow tubing is used in the construction of the glass ceramic coils assembly 34 FIGS. 4, 5, 6, located in the microwave heating chamber 35 FIGS. 4, 5 and 6. The electromagnetic energy or waves produced by the magnetron 51 FIG. 5 are dispersed by the metal stirrer blades 54 FIG. 5 and come in contact with the entire glass ceramic coils assembly 34 FIGS. 4, 5, 6, located within the microwave heating chamber 35 FIGS. 4, 5 and 6. The heater fluid (not shown) flowing in these hollow coils is then simultaneously treated and exposed to this electromagnetic energy causing molecular excitation, atomic motion, high temperature rise between 250-300 degrees Fahrenheit and heat generation. This super heated fluid (not shown) is siphoned and propelled by means of supply and return pumps 43 FIGS. 4, 5, 6, flowing into and through the metallic coils assembly 10 FIGS. 2, 4, 5, 6, located in the compartment below called the reactivation process section 9 FIGS. 2, 4, 5 and 6.

In the preferred embodiment, the hollow tubing of the metallic coils assembly 10 FIGS. 2, 4, 5, 6, located in the reactivation process section 9 FIGS. 2, 4, 5, 6, is constructed of steel, aluminum or other high heat resistant metal which is adaptable to extreme temperature variances and which can effectively retain and transmit heat. It is important to note that the diameter of the tubing of the metallic coils assembly 10 in the reactivation process section 9 is smaller in comparison to the diameter of the glass-ceramic coils assembly 34 in the microwave heating chamber 35 FIGS. 4, 5 and 6.

Also in the preferred embodiment, the distance between the coils of the metallic coils assembly 10 FIGS. 2, 4, 5, 6, in the reactivation process section 9 FIGS. 2, 4, 5, 6, is narrower and the number of actual coifs is 1.5 but in an alternate design may be up to 2 times greater in number of coils comparatively to the glass-ceramic coils assembly 34 FIGS. 4, 5, 6, located in the microwave heating chamber 35 FIGS. 4, 5 and 6. This construction allows for a greater temperature rise and a more efficient heat transfer and distribution to the reactivation process 9 airflow 11b FIGS. 2, 4, 5, 6, as it comes in contact passing across the surface and through the metallic coils assembly 10 FIGS. 2, 4, 5, 6, in the reactivation process section 9 FIGS. 2, 4, 5 and 6. Therefore, the tightly spaced coil design of the metallic coils assembly 10 FIGS. 2, 4, 5, 6, allows for a more effective and substantial heat transfer radiated from the thermal fluid (not shown) onto the metal coils and finally to the reactivation process 9 airflow 11b FIGS. 2, 4, 5 and 6. A substantial temperature rise of the reactivation process 9 airflow 11b of 170-200 degrees Fahrenheit is achieved as it passes through the metallic coils assembly 10 FIGS. 2, 4, 5, 6, in the reactivation process section 9 FIGS. 2, 4, 5 and 6.

This temperature rise of the reactivation process 9 airflow 11b deactivates the desiccant impregnated core material 8 FIG. 2 within the desiccant rotor/wheel assembly 7 FIGS. 2, 4, 5, 6, towering its vapor pressure as the dry hot airflow 11b passes through the desiccant impregnated core material 8. This dry heated airflow 11b with a very low vapor pressure and concentration, enables the desiccant core material 8 to rapidly release the retained accumulated moisture into this airflow 11b as it passes through the desiccant rotor/wheel assembly 7 core 8.

This emerging wet and hot process airflow 11c is then pulled through the evaporator cooling coils assembly 14 FIGS. 2, 4, 5, 6, part of the air treatment and conditioning system 61 FIG. 6 in the condensation process section 15 FIGS. 2 4, 5 and 6. The desiccant core material 8 FIG. 2 is then ready for reuse, as the desiccant rotor/wheel assembly 7 FIGS. 2, 4, 5, 6, rotates about it longitudinal axis and back into the extraction process section 6 FIGS. 2, 4, 5 and 6. The heater fluid (not shown) continues to transfer its heat, flowing through the metallic coils assembly 10 FIGS. 2, 4, 5, 6, in the reactivation process section 9 FIGS. 2, 4, 5 and 6. The thermal fluid is then siphoned by means of a return pump 43b FIGS. 4, 5, 6 and propelled back into the glass-ceramic coils assembly 34 FIGS. 4, 5, 6, in the microwave heating chamber 35 FIGS. 4, 5, 6, as part of a closed-loop fluid circuit.

Therefore, in a perpetual cycle, the thermal fluid undergoes repeated exposure to the microwave electromagnetic energy causing molecular excitation, atomic motion, high temperature rise between 250-300 degrees Fahrenheit and heat generation. Consequently, the thermal fluid (not shown) is the medium which moves back and forth passing through the microwave heating chamber 35 where it absorbs and is super heated, then to the reactivation process section 9 where it then dissipates and radiates its heat as part of the microwave reactivation system 36 FIGS. 4, 5 and 6. It will be understood that in alternative embodiments, the microwave reactivation system 36 will incorporate design modifications which will allow for variations in performance capabilities. The modifications will determine size, output capacity and operational ranges in order to adapt to any PH2OCP system 72 performance requirements.

In the preferred embodiment, the thermal heater fluid (not shown) circulation pumps 43*a* and 43*b* FIGS. 4, 5, 6, are of industrial construction grade and are rated to operate within high temperatures due to the thermal fluid. The modulation and cycling of the power to the high voltage part 49 FIG. 5, is governed by temperature thermocouple and airflow pressure type sensors 44*a* and 44*b* FIGS. 5 and 6. One temperature sensor 44*a* is located in the microwave heating chamber 35 FIGS. 5, 6, another temperature and airflow pressure sensor 44*b* is located in the reactivation process section 9 FIGS. 4, 5, 6, just forward of the desiccant rotor/wheel assembly 7 FIGS. 2, 4, 5 and 6. Two more temperature and airflow pressure sensors 44*c* and 44*d* are located; one airflow and temperature sensor 44*c* FIG. 6 is in the extraction process section 6 FIG. 6 and the other 44*d* FIG. 6 is located at the process airflow outlet 17 FIG. 6. All sensors are mounted in place by a support bracket (not shown) and wiring installed in a system of metallic conduits (not shown) to the control part and to the circuit in the (PLC) programmable logic controller panel 29 FIGS. 3, 4, 7, 8 and 9. These sensors enable the detection of temperature and air pressure variations in the extraction 6, reactivation 9 and condensation 15 processes and relay this information to the PLC panel 29 which in turn governs the various components and sub-systems and specifically the high voltage part 49 FIG. 5 to direct output power to the microwave heating chamber 35 FIGS. 4, 5, 6, which produces the heat generation for the reactivation of the main components of the PH2OCP system 72 which is the desiccant rotor/wheel assembly and 7 core material 8.

Consequently, the temperature thermocouple type sensor 44*a* FIGS. 5, 6, located in the microwave heating chamber 35, ensures that the system operates and modulates as required in order to automatically generate the microwave energy needed to maintain the desired high temperature of the thermal fluid as it flows through the coils assembly 34 in the microwave heating chamber 35 and into the reactivation heating coils assembly 10 in the reactivation process section 9. This thermocouple type sensor detects the temperature generated within the microwave heating chamber 35 as it is emitted off of the glass-ceramic coils assembly 34 which contains the heat radianting thermal fluid. This interaction between the temperature and airflow pressure sensors 44*a,b,c,d*, the high voltage part 49, the control part or PLC 29 as part of the overall operation of the microwave reactivation system 36 within the PH2OCP system 72, ensures that the specified reactivation process airflow 11*b* temperature rise is achieved and maintained for an effective regeneration of the desiccant rotor/wheel assembly 7 core material 8. This guarantees the maximum discharge of moisture vapors from the desiccant rotor wheel 7 core material 8 for transformation into condensate and water by the condensation process 15 as part of the PH2OCP system 72. Therefore, the temperature and airflow pressure sensors in the extraction 6, reactivation 9 and condensation 15 process sections ensure that proper process airflow 11*a,b,c,d*, temperature and static pressure is consistently maintained throughout the PH2OCP system 72 operation.

These sensors are also safety devices during operation which will identify and signal an alarm on the PLC 29 touch screen 37 FIGS. 3, 4, 9, if there is a malfunction such as low reactivation process 9 temperature or drop in process airflow 11*a,b,c,d*, pressure.

These sensors will also shut down the PH2OCP system 72 by signaling the control circuit in the PLC panel 29 in the case where the temperature exceeds the prescribed high temperature operating limit set by the manufacturer or when there is a substantial drop or loss of process airflow 11*a,b,c,d*, pressure through the PH2OCP system 72. In the preferred embodiment, the electrical connections of these components to each other and the control part or PLC panel 29 is achieved by way of several electrical conduits which are constructed and connected in part to the PH2OCP system 72 frame 18 (not shown), yet accessible for maintenance and verification purposes. In the preferred embodiment, all of the electrical conduits and wiring in the PH2OCP system are designed and rated as industrial grade.

The following is a resume of the operation of the microwave reactivation system 36 FIGS. 4, 5, 6 and air treatment and conditioning system 61 FIG. 6 as operational sub-systems within the PH2OCP system 72 FIGS. 1, 3, 4, 7, 8 and 9.

Upon deployment of the (PH2OCP) Portable Water and Climatic Production system 72, the desiccant rotor/wheel assembly 7 is driven to rotate by an electric drive motor 12 and rotation belt assembly 13 along its longitudinal axis. The process airflow 11*a* is simultaneously drawn, moving through the PH2OCP system 72 process inlet 5, by means of a high static direct drive axial blower 16 at the process outlet 17 which siphons the ambient air. The process air 11*a* flows through the process inlet 5 and filter 5*a* from ambient into the extraction process section 6 and through the desiccant rotor/wheel assembly 7 core material 8.

As the process airflow 11*a* passes through the desiccant rotor/wheel assembly 7 core material 8, it is stripped of its moisture by the desiccant core material 8 which is impregnated within its inner walls by a desiccant substance (silica gel) as part of the desiccant NOT/wheel assembly 7. The resultant is dry process airflow 11*b* exhausted from the desiccant rotor/wheel assembly 7 core material 8. The high static direct drive axial blower 16 will maintain a recommended airflow and static pressure for various flow rates (cubic feet per minute—CFM) of at least 2.0 to 3.0+ inches of water column (WC) to provide effective airflow distribution throughout the PH2OCP system 72 processes to ensure at all times the maximum water production output as well as proper conditioned air discharge temperature for air treatment and conditioning, within an area or enclosed space.

In the preferred embodiment, the reactivation process 9 airflow 11*b* rates will be maintained at least at 15 cubic meters per minute/530 cubic feet per minute. As the airflow 11*b* passes through the reactivation process section 9, its temperature dramatically increases as a result of an intense heat transfer radiated from the thermal fluid (not shown) within the metallic coils assembly 10 part of the microwave reactivation system 36. Though there could be acceptable variations in the reactivation process 9 airflow 11*b* temperature, the recommended operating temperature of the reactivation process 9 airflow 11*b* should reach between degrees; 120 C to 150 C 170 F to 300 F. Subsequently, the super heated reactivation process 9 airflow 11*b* with a very low vapor pressure/moisture concentration, passes through the desiccant core material 8, which is saturated with moisture and having a high vapor pressure.

This super heated reactivation process 9 dry airflow 11*b* serves to regenerate the "V" shaped section of the desiccant rotor/wheel assembly 7 by heating the inner walls of the perforated desiccant core material 8. Consequently, this dry heated airflow 11b causes the desiccant core material 8 to de-energize/demagnetize releasing its accumulated moisture back into the airflow 11c. This process airflow 11c which is once again moisture saturated is drawn passing through the condensation process section 15 where it is cooled by means of an evaporator cooling coils assembly 14 as part of the air treatment and conditioning system 61. The moisture vapors within the process airflow 11c condense as they are rapidly cooled down through the evaporator cooling coils 14 transforming the condensate into water 70. This water 70 is gravity fed into a funnel (not shown) located beneath the evaporator cooling coils 14, passing through the filtration 39 and sterilization 40 unit and settling into the unit base reservoir 48. The byproduct which is treated and conditioned process airflow 11d is discharged through the process outlet 17 into the space or enclosure to be treated. During the rotation of the desiccant rotor/wheel assembly 7, prior to re-entering the extraction process section 6, the desiccant rotor/wheel assembly 7 core material 8 having released its moisture vapors due to the effect of the reactivation process 9 airflow 11b, back into the condensation process 15 airflow 11c, has once again a very low vapor pressure. This highly effective process of sorption and desorption made possible by the operational capabilities of the desiccant rotor/wheel assembly 7 core material 8, allows it to again resume its operation of moisture vapors retention in the extraction process 6.

The slow rotational speed of the desiccant rotor/wheel assembly 7 which is one full rotation every 8 to 10 minutes, is required to enable the cooling of the desiccant rotor/wheel assembly 7 core material 8, allowing it to achieve maximum performance as it rotates passing through the various operational PH2OCP system 72 processes.

The air treatment and conditioning system 61 FIG. 6 within the condensation process 15 provides the means for cooling the process airflow 11c and condensing the moisture vapors transforming them into water 70. This water 70 flows downward through a funnel (not shown) where it is cleansed through a carbon filter 39, sanitized and purified with a (UV) ultraviolet lamps assembly 40 depositing into the unit base reservoir 48. A level floater 47 and shaft assembly is fixed and mounted vertically inside the PH2OCP system 72 base reservoir 48. This level floater 47 is allowed to move vertically up or down the shaft assembly depending on the volume of water within the base reservoir in order to avoid overflow. There is a pressure sensor (not shown) located at the top extremity of the shaft which the level floater will energize once it rises to the top of the shaft, making contact with the pressure sensor which transmits a signal to the PLC controller panel 29 which terminates the operation of both the microwave reactivation system 36 and the air treatment and conditioning system 61. If the unit base reservoir 48 is filled, by ceasing the operation of these two sub-systems, the PLC controller 29 ceases the PH2OCP system 72 water production process. Nevertheless, the PLC controller 29 will still enable the PH2OCP system 72 components to continue operating, such as; rotation of the desiccant rotor/wheel assembly 7 and operation of the high static direct drive axial blower 16 to allow for the desiccant rotor/wheel cool down and proper shut-down of the PH2OCP system 72 which can be restarted on demand. In the preferred embodiment, the PH2OCP system 72 unit base reservoir 48 is equipped with two sump pumps 45a,b, FIGS. 4, 6, located at opposite ends of the unit base reservoir 48 and interconnected with a pressure line 46 FIGS. 4, 6, which feeds the water manifold and supply drain assembly 32 FIGS. 4, 6, located on the cabinet 31 rear wall.

This water manifold and supply drain assembly 32 delivers a pressurized flow of fresh production water upon depressing the supply drain lever (not shown) The air treatment and conditioning system 61 incorporates an evaporative cooling coils assembly 14 located in the condensation process section 15, directly in the pathway of the process airflow 11c. These evaporative cooling coils 14 hollow design allows for a refrigerant gas (not shown) to flow within, enabling it to rapidly cool down the process airflow 11c temperature by extracting its heat. The evaporator cooling coils assembly 14 is connected to the other components; including the compressor 59 and condenser coils 58 by means of two (2) metal pipes 65; supply and return piping or lines.

These supply and return hollow piping/lines 65 serve to circulate the refrigerant gas from the evaporator cooling coils assembly 14 to the compressor 59 and onto the condensing coils assembly 58. The refrigerant gas then leaves the condenser coils assembly 58 passing through a receiver dryer (not shown) and expansion/metering valve 64 and fed back to the evaporator cooling coils assembly 14 as part of a closed-loop split type air treatment and conditioning system 61. The condenser coils assembly 58 hollow design and fins (not shown) serve to cool down the heat laden refrigerant gas flowing within.

This cooling effect is provided by means of a high velocity exhaust fan and motor assembly 60 which is located on top of the PH2OCP system 72 cabinet 31 above the compressor 59 and condenser coils assembly.

This exhaust fan motor assembly 60 draws ambient air through the cabinet 31 side wall intake 30 and across the condenser coils assembly 58, to collect and evacuate the heat emitted from the condenser coils 58 by the circulating hot gas within. The exhaust fan motor assembly 60 siphons and expels the hot airstream upward and away from the condenser coils assembly 58 and into ambient. This effect cools the condenser coils assembly 58 which in turn cools down the refrigerant gas as it is circulated back into the evaporator coils assembly 14 part of this split type air treatment and conditioning system 61. Though any legal refrigerant gas can be utilized in the PH2OCP system 72, in the preferred embodiment, the refrigerant gases used for reasons of safety and to meet environmental standards are either; R417A as a replacement for R22 or alternate gases such as; R134A, R407C, R410A. These refrigerant gases have a low chlorine content and ozone depletion potential (ODP) as compared to gases such as; R22 which though still in use, is considered more harmful to the environment. While the evaporator cooling coils assembly 14 is located in the condensation process section 15, the other components such as; condenser coils assembly 58, compressor 59, high velocity exhaust fan and motor assembly 60, receiver dryer (not shown) and expansion/metering valve 64 are located in a separate compartment within the cabinet 31, above the extraction process section 6.

The supply and return piping 65 linking the evaporating 14 and condensing 58 parts of the air treatment and conditioning system 61 are installed within a sealed and insolated metal conduit or channel (not shown) which is constructed as part of the inner cabinet 31.

This metal conduit or channel (not shown) runs from the condensing unit compartment (access panel 33c), down the inner cabinet 31, through the extraction process section 6 and the condensation process section 15 (access panel 33d).

Although the foregoing description and accompanying drawings relate to specific preferred embodiments of the present invention and specific sub-systems, methods and processes for the PH2OCP system 72 as presently contemplated by the inventor, it will be understood that various modifications, changes and adaptations, may be made without departing in any way from the spirit of the invention.

The invention claimed is:

1. A portable water and climatic production (PH2OCP) system for sorption or extraction of moisture vapors form air and desorption or release of moisture vapors into condensate for transformation into water is comprised of a desiccant rotor/wheel assembly and the following operational sub-systems and components as described;
   a. a cabinet;
   b. a desiccant rotor/wheel assembly rotatively mounted within the cabinet and having the core impregnated with a desiccant core material and a metallic outer shell construction surrounding the desiccant core material;
   c. a desiccant rotor/wheel assembly which simultaneously rotates through an extraction process section, a reactivation process section and condensation process section;
   d. means for driving the rotation of the desiccant rotor/wheel assembly within the cabinet;
   e. a high static suction blower to provide means for drawing a process airflow from ambient environment and drawing it through the PH2OCP system;
   e. wherein the reactivation process section includes a sub-system identified as microwave reactivation system which incorporates a microwave heating chamber, operating components and coils assemblies located in both the microwave heating chamber for heating a thermal fluid which is circulated by means of pumps into a reactivation heating coils assembly;
   f. wherein the microwave heating chamber is enclosed in an explosion-proof casing or cabinet, and includes system components for purpose of raising the temperature of a thermal fluid within the coils assemblies which come in contact and heat the incoming process airflow drawn into the reactivation process section to create a super heated reactivation process airflow;
   g. wherein the super heated reactivation process airflow having a deactivating and demagnetizing affect on the desiccant rotor/wheel core material, wherein the moisture retained within the desiccant core material is immediately released back into the process airflow drawn into the condensation process section, such that a moisture saturated process airflow is created;
   h. wherein the condensation process section includes an evaporator cooling coils assembly as part of an air treatment and conditioning system located downstream of the desiccant rotor/wheel which cools the moisture saturated process airflow expelled by the desiccant core material condensing the moisture vapors for transformation into water production;
   i. wherein the air treatment and conditioning sub-system designed as a split system incorporating an evaporator coils assembly in the condensation process section and condenser coils assembly including a compressor and operational components for the purpose of cooling and condensing moisture vapors within the moisture saturated process airflow drawn to the condensation process section for transformation into water production;
   j. a process outlet which is located downstream of the desiccant rotor/wheel assembly and condensation process section with the purpose of exhausting the conditioned process airflow into ambient atmosphere or an area to be conditioned and humidity controlled.

2. The system of claim 1, further comprising a frame for supporting the unit cabinet and serving also as a ground.

3. The system of claim 1, wherein the means for driving rotation includes an electric drive motor.

4. The system of claim 3, wherein the motor is one of the following:
   a. electrically driven motor
   b. pneumatically driven motor
   c. hydraulically driven motor.

5. The system of claim 1, wherein the high static suction blower is located in the process outlet downstream of the condensation process section and is driven by an electric direct drive motor.

6. The system of claim 5, wherein the high static suction blower is one of the following:
   a. electrically driven motor
   b. pneumatically driven motor
   c. hydraulically driven motor.

7. The system of claim 1, wherein the microwave reactivation system is part of the reactivation process section, and wherein the microwave reactivation system is responsible for heating the reactivation process airflow using electrical energy as the power source generated from various groups consisting of;
   a. standard electrical main or power grid energy
   b. electromechanical or electromagnetic power generated energy
   c. photovoltaic—solar power energy
   d. wind power energy
   e. electrochemical—battery or fuel cell energy.

8. The system of claim 1, wherein the microwave reactivation system includes at least two interconnected coils assemblies as part of a closed-loop system wherein one coil assembly located in the microwave heating chamber and the other in the reactivation process section, each filled with a thermal fluid which is pumped and flows through the closed-loop coils assemblies.

* * * * *